US012501379B2

(12) United States Patent
Rudolf

(10) Patent No.: US 12,501,379 B2
(45) Date of Patent: Dec. 16, 2025

(54) TRANSMISSION TIMING IN FULL-DUPLEX SYSTEMS

(71) Applicant: Samsung Electronics Co., Ltd., Suwon-si (KR)

(72) Inventor: Marian Rudolf, Longueuil (CA)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 18/063,596

(22) Filed: Dec. 8, 2022

(65) Prior Publication Data

US 2023/0209483 A1 Jun. 29, 2023

Related U.S. Application Data

(60) Provisional application No. 63/294,226, filed on Dec. 28, 2021.

(51) Int. Cl.
*H04J 3/06* (2006.01)
*H04W 56/00* (2009.01)
*H04W 72/0446* (2023.01)
*H04W 72/23* (2023.01)
*H04W 80/02* (2009.01)

(52) U.S. Cl.
CPC ..... *H04W 56/001* (2013.01); *H04W 72/0446* (2013.01); *H04W 72/23* (2023.01); *H04W 80/02* (2013.01)

(58) Field of Classification Search
CPC ... H04W 56/001; H04W 72/23; H04W 80/02; H04W 72/0446
See application file for complete search history.

(56) References Cited

U.S. PATENT DOCUMENTS

| 2017/0331611 | A1  | 11/2017 | Stern-Berkowitz |           |
|--------------|-----|---------|-----------------|-----------|
| 2019/0149365 | A1* | 5/2019  | Chatterjee      | H04W 76/11|
|              |     |         |                 | 370/329   |
| 2019/0246398 | A1* | 8/2019  | Chen            | H04W 76/27|
| 2020/0221405 | A1* | 7/2020  | Zarifi          | H04W 52/50|

(Continued)

FOREIGN PATENT DOCUMENTS

| CN | 113366904 A    | 9/2021  |
|----|----------------|---------|
| WO | 2021234581 A1  | 11/2021 |
| WO | 2021234582 A1  | 11/2021 |

OTHER PUBLICATIONS

International Search Report and Written Opinion issued Mar. 31, 2023 regarding International Application No. PCT/KR2022/021310, 8 pages.

(Continued)

*Primary Examiner* — Abdelnabi O Musa

(57) ABSTRACT

Apparatuses and methods for transmission timing in full-duplex systems. A method for receiving a downlink (DL) signal or channel associated with a reception timing procedure includes receiving first information for a receive timing adjustment value and second information for a condition. The method further includes determining a DL reference timing and whether the condition is valid for reception in a slot. The method further includes receiving the DL signal or channel in the slot based on the receive timing adjustment value and the DL reference timing when the condition is valid and the DL reference timing when the condition is not valid.

20 Claims, 12 Drawing Sheets

(56) References Cited

U.S. PATENT DOCUMENTS

2023/0247574 A1* 8/2023 Ghanbarinejad ... H04W 56/001
                                                    370/503
2023/0276438 A1* 8/2023 Rudolf .............. H04W 72/1268

OTHER PUBLICATIONS

"5G; NR; Physical channels and modulation (3GPP TS 38.211 version 17.3.0 Release 17)", ETSI TS 138 211 V17.3.0, Sep. 2022, 141 pages.
"5G; NR; Multiplexing and channel coding (3GPP TS 38.212 version 17.3.0 Release 17)", ETSI TS 138 212 V17.3.0, Sep. 2022, 206 pages.
"5G; NR; Physical layer procedures for control (3GPP TS 38.213 version 17.3.0 Release 17)", ETSI TS 138 213 V17.3.0, Sep. 2022, 262 pages.
"5G; NR; Physical layer procedures for data (3GPP TS 38.214 version 17.3.0 Release 17)", ETSI TS 138 214 V17.3.0, Sep. 2022, 237 pages.
"3rd Generation Partnership Project; Technical Specification Group Radio Access Network; NR; Medium Access Control (MAC) protocol specification (Release 17)", 3GPP TS 38.321 V17.2.0, Sep. 2022, 246 pages.
"3rd Generation Partnership Project; Technical Specification Group Radio Access Network; NR; Radio Resource Control (RRC) protocol specification (Release 17)", 3GPP TS 38.331 V17.2.0, Sep. 2022, 1298 pages.
Extended European Search Report issued Feb. 27, 2025 regarding Application No. 22916660.8, 12 pages.

* cited by examiner

| RS ID | Receive timing adjustment 1 | | Octet 1 |
|---|---|---|---|
| Receive Timing Adjustment 2 | | R | Octet 2 |

TRANSMISSION TIMING IN FULL-DUPLEX SYSTEMS

CROSS-REFERENCE TO RELATED APPLICATION AND CLAIM OF PRIORITY

This application claims priority under 35 U.S.C. § 119(e) to U.S. Provisional Patent Application No. 63/294,226 filed on Dec. 28, 2021. The above-identified provisional patent application is hereby incorporated by reference in its entirety.

TECHNICAL FIELD

The present disclosure relates generally to wireless communication systems and, more specifically, to transmission timing in full-duplex systems.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for transmission timing in full-duplex systems.

In one embodiment, a method for receiving a downlink (DL) signal or channel associated with a reception timing procedure is provided. The method includes receiving first information for a receive timing adjustment value and second information for a condition. The method further includes determining a DL reference timing and whether the condition is valid for reception in a slot. The method further includes receiving the DL signal or channel in the slot based on the receive timing adjustment value and the DL reference timing when the condition is valid and the DL reference timing when the condition is not valid.

In another embodiment, a user equipment (UE) is provided. The UE includes a transceiver configured to receive first information for a receive timing adjustment value and second information for a condition. The UE further includes a processor operably coupled to the transceiver. The processor is configured to determine a DL reference timing and whether the condition is valid for reception in a slot. The transceiver is further configured to receive a DL signal or channel in the slot based on the receive timing adjustment value and the DL reference timing when the condition is valid and the DL reference timing when the condition is not valid.

In yet another embodiment, a base station (BS) is provided. The BS includes a processor and a transceiver operably coupled to the processor. The transceiver configured to transmit first information for a receive timing adjustment value, second information for a condition, and a DL signal or channel in a slot for reception based on the receive timing adjustment value and a DL reference timing when the condition is valid and the DL reference timing when the condition is not valid.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
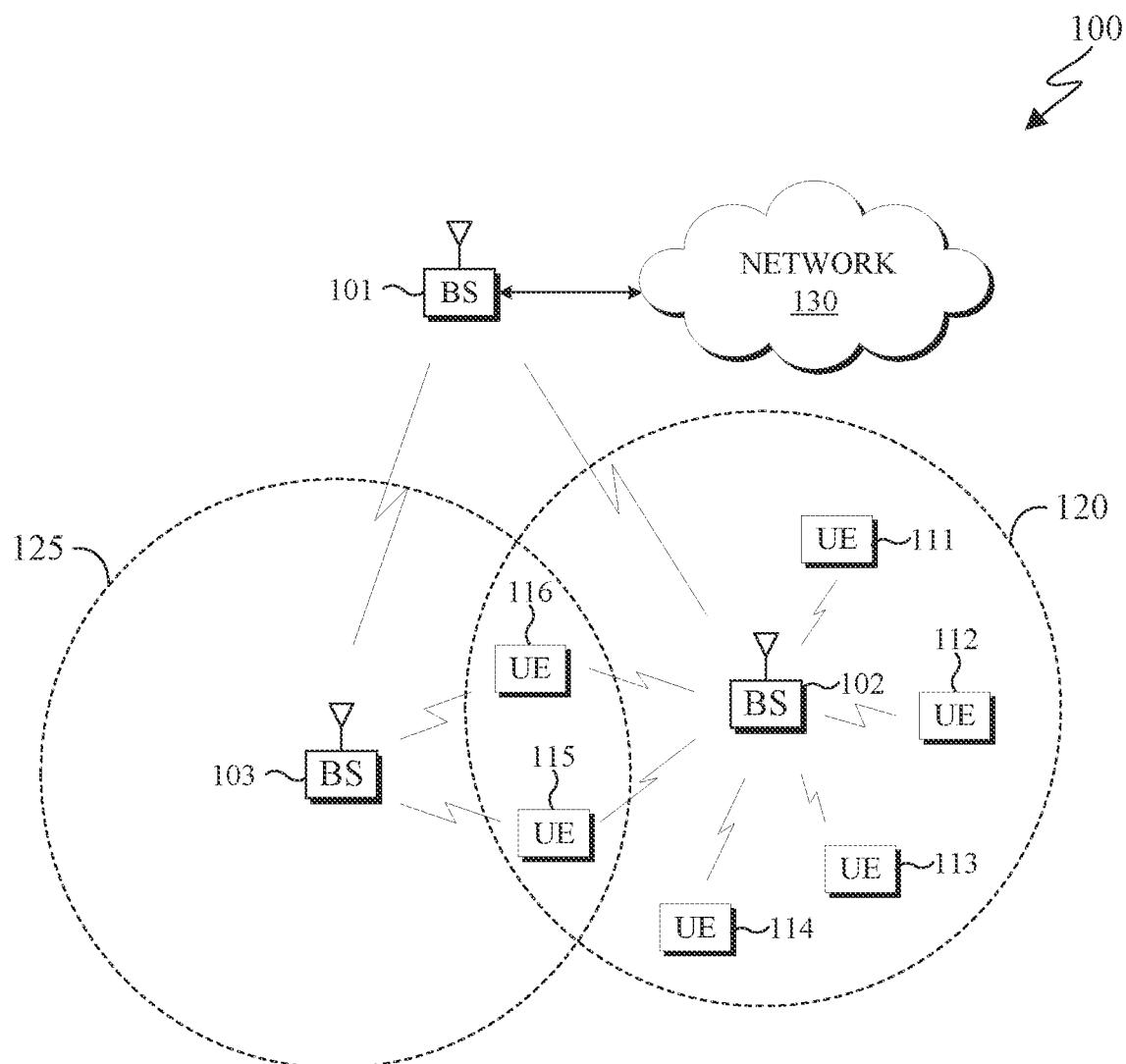
FIG. 1 illustrates an example wireless network according to embodiments of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v17.3.0, "NR; Physical channels and modulation" ("REF1"); 3GPP TS 38.212 v17.3.0, "NR; Multiplexing and channel coding" ("REF2"); 3GPP TS 38.213 v17.3.0, "NR; Physical layer procedures for control" ("REF3"); 3GPP TS 38.214 v17.3.0, "NR; Physical layer procedures for data" ("REF4"); 3GPP TS 38.321 v17.2.0, "NR; Medium Access Control (MAC) protocol specification" ("REF5"); and 3GPP TS 38.331 v17.2.0, "NR; Radio Resource Control (RRC) protocol specification" ("REF6").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
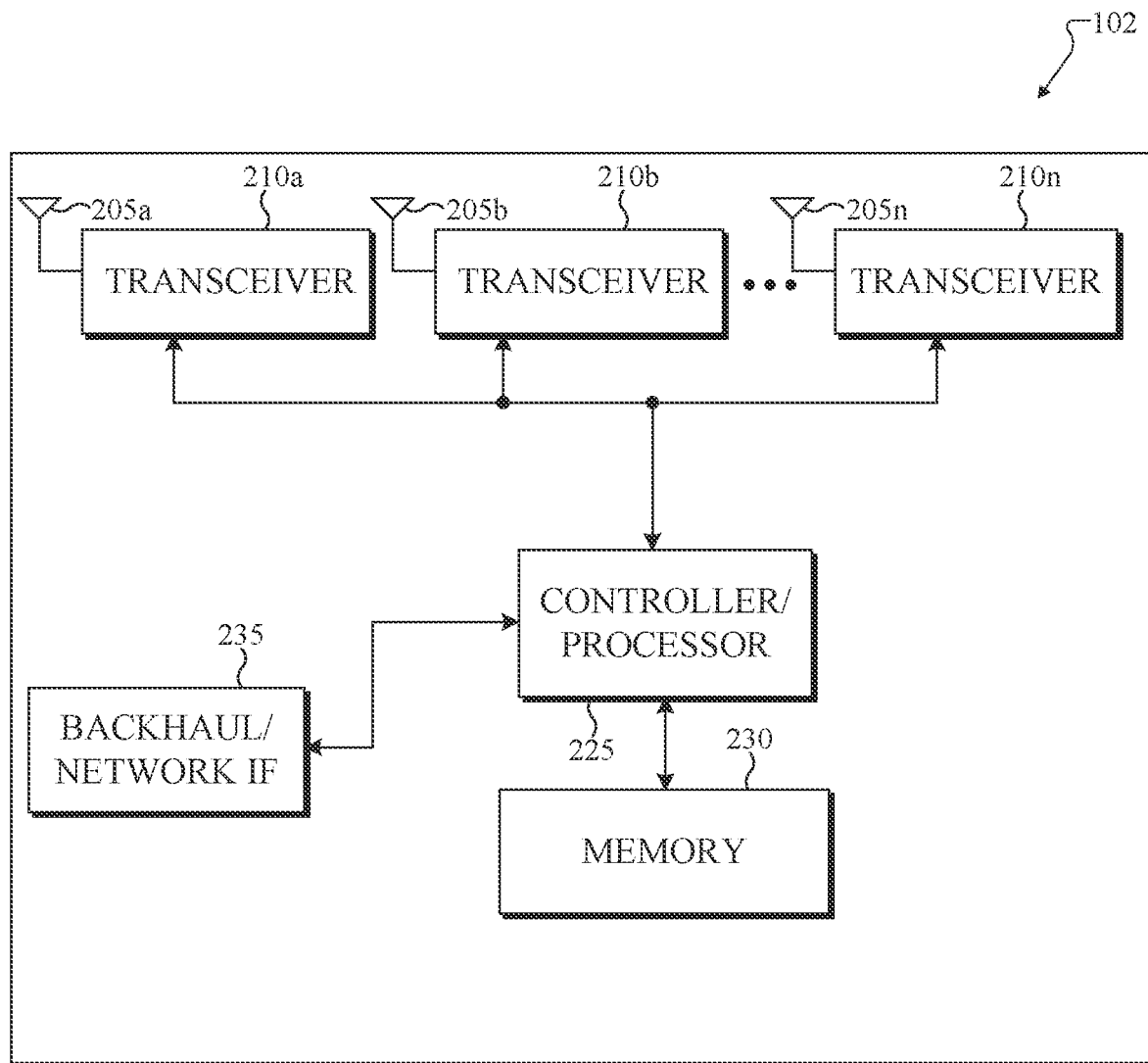
FIG. 2 illustrates an example gNB according to embodiments of the present disclosure.
Figure 3:
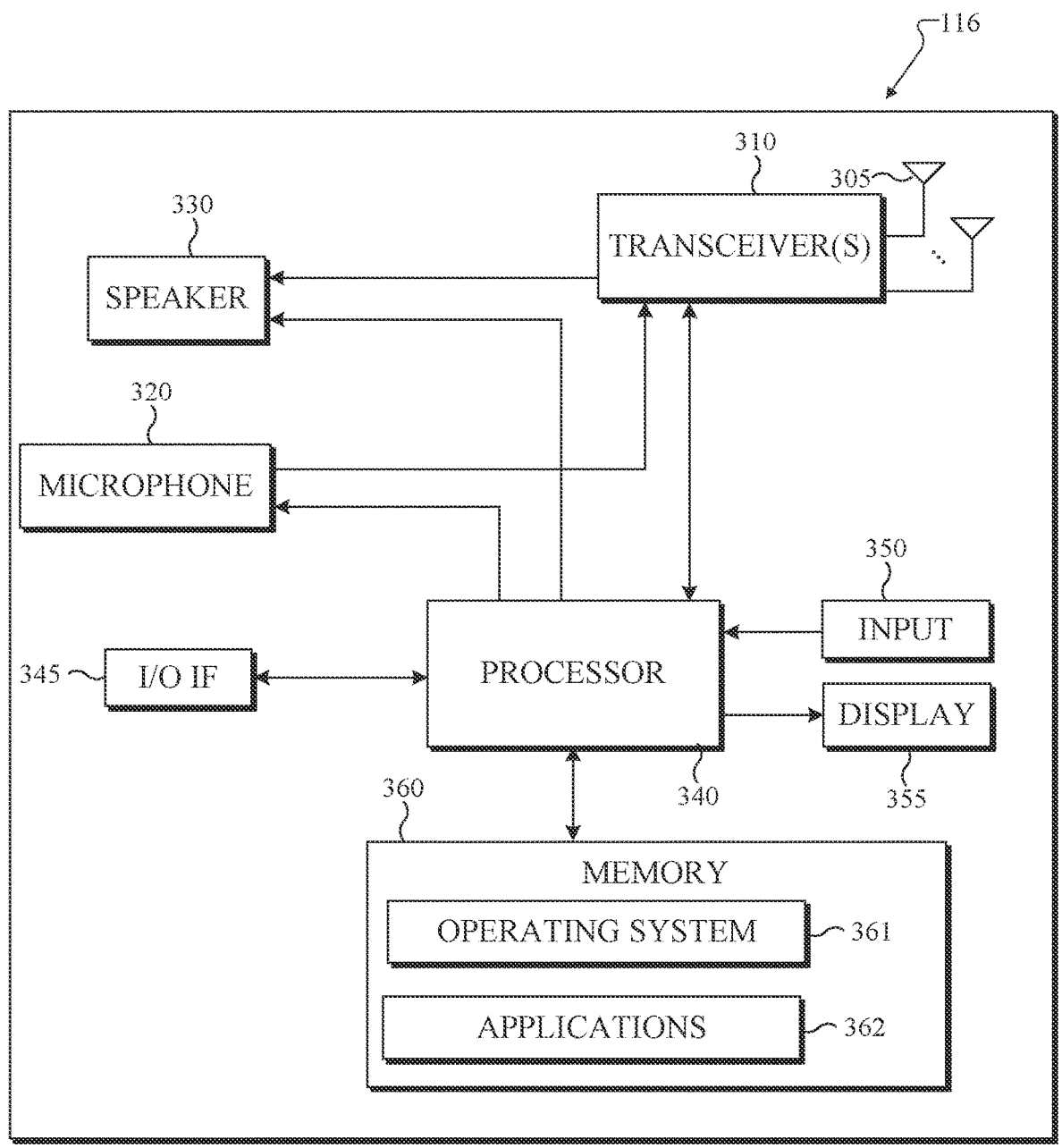
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for triggering transmission timing in full-duplex systems. In certain embodiments, one or more of the BSs 101-103 include circuitry, programming, or a combination thereof for triggering transmission timing in full-duplex systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming radio frequency (RF) signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for uplink transmission in full duplex systems. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
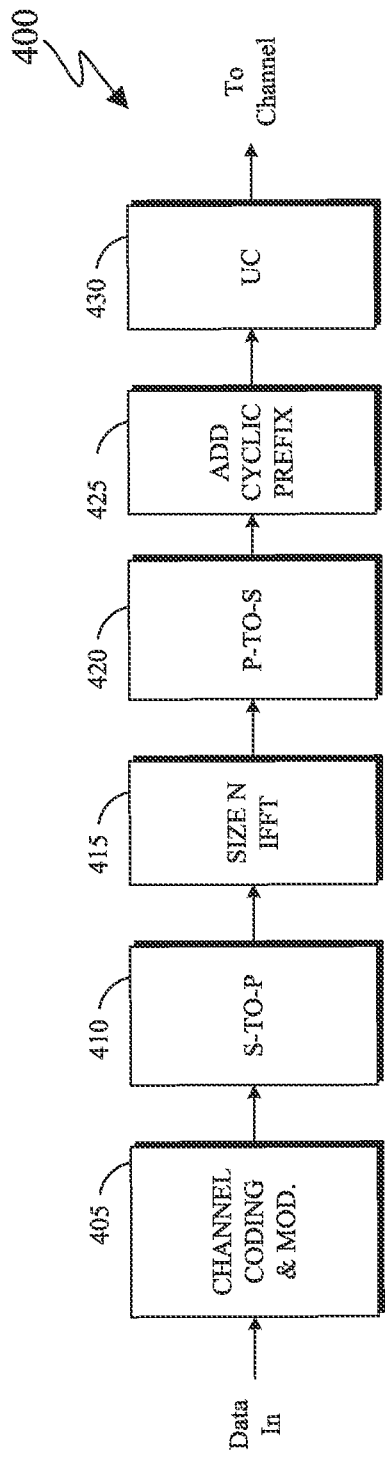
FIGS. 4 and 5 illustrate example wireless transmit and receive paths according to embodiments of the present disclosure.
Figure 5:
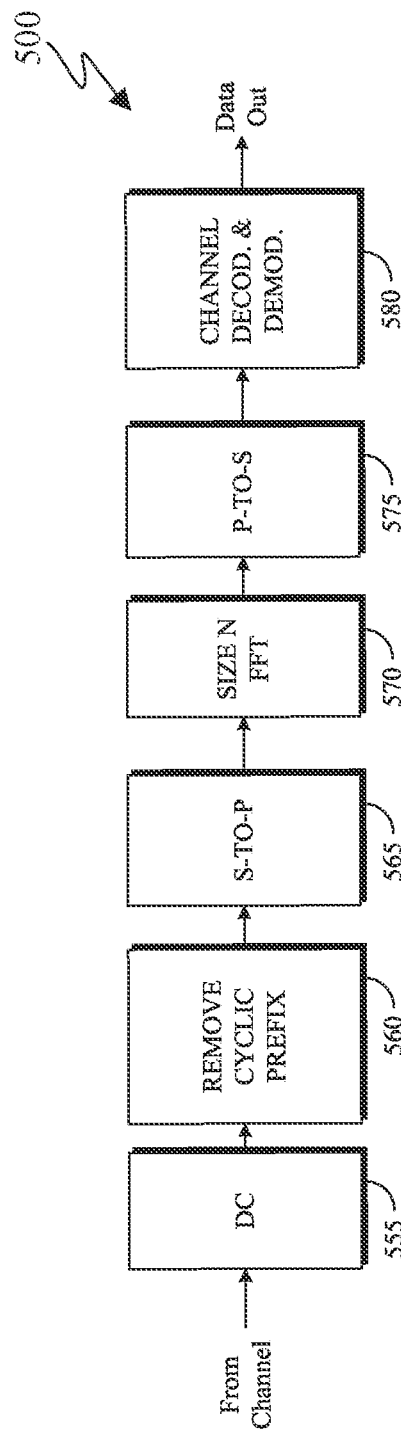

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support triggering transmission timing in full-duplex systems as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access (see also NR specification). A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an active UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in a buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER (see NR specification), of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH.

UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random access channel (PRACH as shown in NR specifications).

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same PRG.

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE may assume that SSBs transmitted with the same block index on the same center frequency location are quasi co-located with respect to Doppler spread, Doppler shift, average gain, average delay, delay spread, and, when applicable, spatial Rx parameters. The UE may not assume quasi co-location for any other SS/PBCH block transmissions.

In absence of CSI-RS configuration, and unless otherwise configured, the UE may assume PDSCH DM-RS and SSB to be quasi co-located with respect to Doppler shift, Doppler spread, average delay, delay spread, and, when applicable, spatial Rx parameters. The UE may assume that the PDSCH DM-RS within the same CDM group are quasi co-located with respect to Doppler shift, Doppler spread, average delay, delay spread, and spatial Rx. The UE may also assume that DMRS ports associated with a PDSCH are QCL with QCL type A, type D (when applicable) and average gain. The UE may further assume that no DM-RS collides with the SS/PBCH block.

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi-colocation (QCL) relationship between one or two downlink reference signals and the DMRS ports of the PDSCH, the DMRS port of PDCCH or the CSI-RS port(s) of a CSI-RS resource.

The quasi co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi co-location types corresponding to each DL RS are given by the higher layer parameter qcl-Type in QCL-Info and may take one of the following values: QCL-TypeA: {Doppler shift, Doppler spread, average delay, delay spread}; QCL-TypeB: {Doppler shift, Doppler spread; QCL-TypeC: {Doppler shift, average delay}; and QCL-TypeD: {Spatial Rx parameter}.

The UE receives a MAC-CE activation command to map up to [N] (e.g., N=8) TCI states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot e.g., $n+3N_{slot}^{subframe,\mu}$.

The NR UL allows for operation with intra-cell orthogonality. UL transmissions received from the UEs within a cell do not create interference to each other. This implies that UL slot boundaries for a given SCS must be received approximately time aligned at the gNB. Ideally, the Rx timing misalignment between the UL signals from UEs should fall within the CP. Like LTE and other cellular communications systems, NR includes a UE UL transmit timing procedure. Timing advance is a negative transmission time offset at the UE between the start of a DL slot as observed by the UE and the start of a slot in the UL. When the transmission time offset is controlled for each UE, the gNB can control the timing of the signals received at the gNB from the UEs. UEs far from the gNB have a larger propagation delay and need to start their UL transmissions more in advance compared to UEs located closer to the gNB. The value of the timing advance for each UE can be determined by the gNB through different means. For example, measurements on the respective UL transmissions like SRS, PUCCH or PUSCH from the UEs can be used. When UEs carry out UL transmissions, the receiving gNB can estimate the UL receive timing and thus issue the corresponding timing advance (TA) commands in the DL. TA commands are UE specific and transmitted as a MAC CE on the DL-SCH. TA commands for a UE are transmitted relatively infrequently, e.g., one or a few times per second. When a UE moves fast, TA commands can be transmitted more frequently. Because the target of the TA procedure is to keep the Rx timing misalignment between UL signals transmitted from UEs at the gNB within the size of the CP, the step size of the TA is chosen as a fraction of the CP. Different from LTE, NR supports multiple numerologies. The CP becomes shorter the higher the SCS, so the NR TA step size is scaled in proportion to the CP length and obtained by the SCS of the active UL BWP. When a UE has not received a TA command during a configurable time period, the UE assumes it has lost UL synchronization. In this case, the UE must reestablish UL timing using the Random Access procedure first before any subsequent PUSCH or PUCCH transmission in the UL.

In the cases of carrier aggregation or dual connectivity, there may be two or more component carriers transmitted from a UE. When the different UL component carriers from the UE are all received at the same geographical location, a same TA value can be employed for all UL component carriers. When different UL component carriers are received at different geographical locations, the different UL carriers need different TA values to align the UL Rx timings at the distinct reception sites. This is the case for gNB deployments using remote radio heads or with dual connectivity where different UL component carriers are terminated at different sites. In these cases, LTE and NR group the UL component carriers in Timing Advance Groups (TAGs) and different TA commands apply to different TAGs. All component carriers in the same group are subject to the same TA command. The TA step size is determined by the highest SCS among the carriers in a TAG.

The NR DL and UL transmissions are organized into frames with $T_f=(\Delta f_{max} \cdot N_f/100) \cdot T_c=10$ ms duration, each consisting of ten subframes of $T_{sf}=(\Delta f_{max} N_f/1000) \cdot T_c=1$ ms duration. The time units $T_c=1/(\Delta f_{max} \cdot N_f)$ where $\Delta f_{max}=480 \cdot 10^3$ Hz and $N_f=4096$ are defined by REF1. The constant $\kappa=T_s/T_c=64$ where $T_s=1/(\Delta f_{ref} \cdot N_{f,ref})$, $\Delta f_{ref}=15 \cdot 10^3$ Hz and $N_{f,ref}=2048$. The number of consecutive OFDM symbols per subframe is $N_{symb}^{subframe,\mu}=N_{symb}^{slot}N_{slot}^{subframe,\mu}$. Each frame is divided into two equally-sized half-frames of five subframes each with half-frame 0 consisting of subframes 0-4 and half-frame 1 consisting of subframes 5-9. There is one set of frames in the UL and one set of frames in the DL on a carrier.

Figure 6:
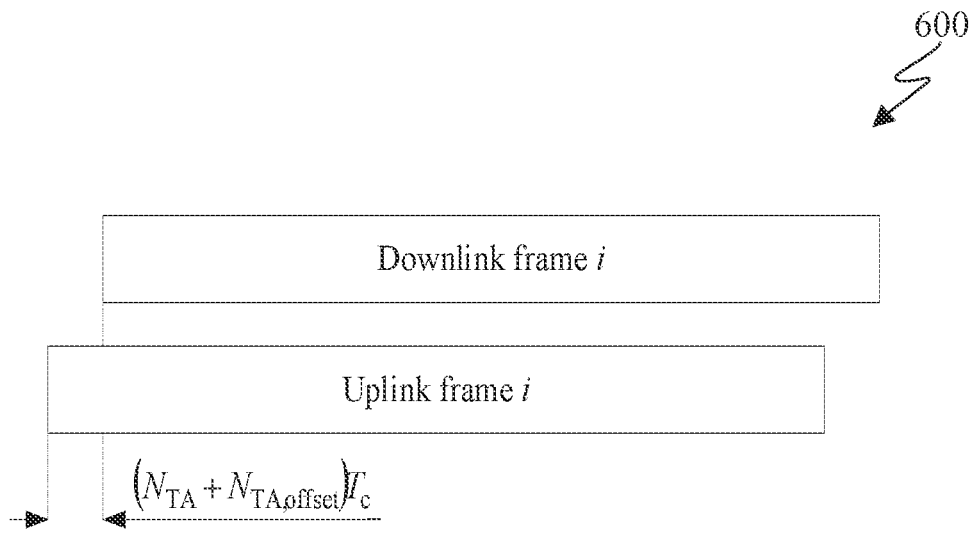
FIG. 6 illustrates an UL-DL timing relation in NR according to embodiments of the disclosure.

FIG. 6 illustrates an UL-DL timing relation in NR 600 according to embodiments of the disclosure. The embodiment of the UL-DL timing relation in NR 600 illustrated in FIG. 6 is for illustration only. FIG. 6 does not limit the scope of this disclosure to any particular implementation of the UL-DL timing relation in NR.

As shown in FIG. 6, UL frame number i for transmission from the UE starts $T_{TA}=(N_{TA}+N_{TA,offset})T_c$ before the start of the corresponding DL frame at the UE where $N_{TA,offset}$ is given by REF3, except for MsgA transmission on PUSCH where $N_{TA}=0$ is used.

A UE can be provided a value $N_{TA,offset}$ of a timing advance offset for a serving cell by parameter n-TimingAdvanceOffset for the serving cell. If the UE is not provided n-TimingAdvanceOffset for a serving cell, the UE determines a default value $N_{TA,offset}$ of the timing advance offset for the serving cell as described in REF1. If a UE is configured with two UL carriers for a serving cell, a same timing advance offset value $N_{TA,offset}$ applies to both carriers.

A UE can be configured with one or more Timing Advance Group (TAG). A TAG is a group of Serving Cells that is configured by RRC for cells with an UL using the same timing reference cell and the same Timing Advance value. A Timing Advance Group containing the SpCell of a MAC entity is referred to as Primary Timing Advance Group (PTAG), whereas the term Secondary Timing Advance Group (STAG) refers to other TAGs.

Upon reception of a timing advance command for a TAG, the UE adjusts UL timing for PUSCH, SRS, or PUCCH transmission on all the serving cells in the TAG based on a value $N_{TA,offset}$ that the UE expects to be same for all the serving cells in the TAG and based on the received timing advance command where the UL timing for PUSCH, SRS or PUCCH transmissions is the same for all the serving cells in the TAG.

For a band with synchronous contiguous intra-band EN-DC in a band combination with non-applicable maximum transmit timing difference requirements as described in REF1, if the UE indicates ul-TimingAlignmentEUTRA-NR as 'required' and UL transmission timing based on timing adjustment indication for a TAG from MCG and a TAG from SCG are determined to be different by the UE, the UE adjusts the transmission timing for PUSCH/SRS/PUCCH transmission on all serving cells part of the band with the synchronous contiguous intra-band EN-DC based on timing adjustment indication for a TAG from a serving cell in MCG in the band. The UE is not expected to transmit a PUSCH/SRS/PUCCH in one CG when the PUSCH/SRS/PUCCH is overlapping in time, even partially, with random access preamble transmitted in another CG.

For a SCS of $2^\mu \cdot 15$ kHz, the timing advance command for a TAG indicates the change of the UL timing relative to the current UL timing for the TAG in multiples of $16 \cdot 64 \cdot T_c/2^\mu$. The start timing of the random access preamble is handled differently by the UE and described in REF1.

A timing advance command received by random access response or by an absolute timing advance command MAC CE (REF5), $T_A$, for a TAG indicates $N_{TA}$ values by index values of $T_A = 0, 1, 2, \ldots, 3846$, where an amount of the time alignment for the TAG with SCS of $2^\mu \cdot 15$ kHz is $N_{TA} = T_A \cdot 16 \cdot 64/2^\mu$. $N_{TA}$ is defined in REF1 and is relative to the SCS of the first UL transmission from the UE after the reception of the random access response or absolute timing advance command MAC CE. In other cases, a timing advance command received by timing advance command MAC CE (REF5), $T_A$, for a TAG indicates adjustment of a current $N_{TA}$ value, $N_{TA\_old}$, to the new $N_{TA}$ value, $N_{TA\_new}$, by index values of $T_A = 0, 1, 2, \ldots, 63$, where for a SCS of $2^\mu \cdot 15$ kHz, $N_{TA\_new} = N_{TA\_old} + (T_A - 31) \cdot 16 \cdot 64/2^\mu$.

If a UE has multiple active UL BWPs in a same TAG, including UL BWPs in two UL carriers of a serving cell, the timing advance command value is relative to the largest SCS of the multiple active UL BWPs. The applicable $N_{TA\_new}$ value for an UL BWP with lower SCS may be rounded to align with the timing advance granularity for the UL BWP with the lower SCS while satisfying the timing advance accuracy requirements in REF1.

Adjustment of an $N_{TA}$ value by a positive or a negative amount indicates advancing or delaying the UL transmission timing for the TAG by a corresponding amount, respectively.

For a timing advance command received on UL slot n and for a transmission other than a PUSCH scheduled by a RAR UL grant or a fallbackRAR UL grant, or a PUCCH with HARQ-ACK information in response to a successRAR, the corresponding adjustment of the UL transmission timing applies from the beginning of UL slot n+k+1 where $k = \lceil N_{slot}^{subframe,\mu} \cdot (N_{T,1} + N_{T,2} + N_{TA,max} + 0.5)/T_{sf} \rceil$, $N_{T,1}$ is a time duration in msec of $N_1$ symbols corresponding to a PDSCH processing time for UE processing capability 1 (REF4) when additional PDSCH DM-RS is configured, $N_{T,2}$ is a time duration in msec of $N_2$ symbols corresponding to a PUSCH preparation time for UE processing capability 1 (REF4), $N_{TA,max}$ is the maximum timing advance value in msec that can be provided by a TA command field of 12 bits, $N_{slot}^{subframe,\mu}$ is the number of slots per subframe, and $T_{sf}$ is the subframe duration of 1 msec. $N_1$ and $N_2$ are determined with respect to the minimum SCS among the SCSs of all configured UL BWPs for all UL carriers in the TAG and of all configured DL BWPs for the corresponding downlink carriers. For $\mu=0$, the UE assumes $N_{1,0}=14$ (REF4). Slot n and $N_{slot}^{subframe,\mu}$ are determined with respect to the minimum SCS among the SCSs of all configured UL BWPs for all UL carriers in the TAG. $N_{TA,max}$ is determined with respect to the minimum SCS among the SCSs of all configured UL BWPs for all UL carriers in the TAG and for all configured initial UL BWPs provided by initialUplinkBWP. The UL slot n is the last slot among UL slot(s) overlapping with the slot(s) of PDSCH reception assuming $T_{TA}=0$, where the PDSCH provides the timing advance command and $T_{TA}$ is defined in REF1.

If a UE changes an active UL BWP between a time of a timing advance command reception and a time of applying a corresponding adjustment for the UL transmission timing, the UE determines the timing advance command value based on the SCS of the new active UL BWP. If the UE changes an active UL BWP after applying an adjustment for the UL transmission timing, the UE assumes a same absolute timing advance command value before and after the active UL BWP change.

If the received DL timing changes and is not compensated or is only partly compensated by the UL timing adjustment without timing advance command as described in REF1, the UE changes $N_{TA}$ accordingly. If two adjacent slots overlap due to a TA command, the latter slot is reduced in duration relative to the former slot.

RRC configures the following parameters for the maintenance of UL time alignment: timeAlignmentTimer (per TAG) which controls how long the MAC entity considers the Serving Cells belonging to the associated TAG to be UL time aligned.

When a Timing Advance Command MAC CE is received, and if an $N_{TA}$ as defined in REF1 has been maintained with the indicated TAG, the MAC applies the Timing Advance Command for the indicated TAG and starts or restarts the timeAlignmentTimer associated with the indicated TAG.

When a Timing Advance Command is received in a Random Access Response message for a Serving Cell belonging to a TAG or in a MsgB for an SpCell, the MAC applies the Timing Advance Command for this TAG, starts or restarts the timeAlignmentTimer associated with this TAG if the Random Access Preamble was not selected by the MAC entity among the contention-based Random Access Preamble, else if the timeAlignmentTimer associated with this TAG is not running, it applies the Timing Advance Command for this TAG and starts the timeAlignmentTimer associated with this TAG. When Contention Resolution is considered not successful; the MAC entity stops the timeAlignmentTimer associated with this TAG.

When a timeAlignmentTimer associated with the Primary TAG expires, the MAC entity flushes all HARQ buffers for all Serving Cells, notifies RRC to release PUCCH and/or SRS for all Serving Cells, and if configured, clears any configured DL assignments and configured UL grants, clears any PUSCH resource for semi-persistent CSI reporting, considers all running timeAlignmentTimers as expired, but maintains $N_{TA}$ (REF1) of all TAGs. A separate set of rules applies to the case when the timeAlignmentTimer associated with a Secondary TAG expires.

When the MAC entity stops UL transmissions for an SCell due to the fact that the maximum UL transmission timing difference between TAGs of the MAC entity or the maximum UL transmission timing difference between TAGs of any MAC entity of the UE is exceeded, the MAC entity considers the timeAlignmentTimer associated with the SCell as expired.

The MAC entity does not perform any UL transmission on a Serving Cell except the Random Access Preamble and MsgA transmission when the timeAlignmentTimer associated with the TAG to which this Serving Cell belongs is not running. Furthermore, when the timeAlignmentTimer associated with the Primary TAG is not running, the MAC entity does not perform any UL transmission on any Serving Cell except the Random Access Preamble and MsgA transmission on the SpCell.

Figure 7:
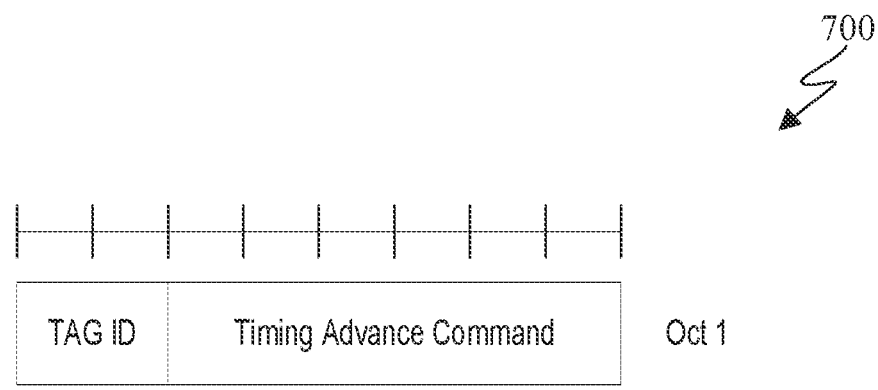
FIG. 7 illustrates a Timing Advance Command MAC CE according to embodiments of the disclosure.

FIG. 7 illustrates a Timing Advance Command MAC CE 700 according to embodiments of the disclosure. The embodiment of the Timing Advance Command MAC CE 700 illustrated in FIG. 7 is for illustration only. FIG. 7 does not limit the scope of this disclosure to any particular implementation of the Timing Advance Command MAC CE.

As illustrated in FIG. 7, the Timing Advance Command MAC CE is identified by MAC subheader with LCID=61 as defined in REF5. It has a fixed size and consists of a single octet. It contains the TAG Identity (TAG ID) indicating the TAG Identity of the addressed TAG. The TAG containing the SpCell has the TAG Identity 0. The length of the field is 2 bits. This MAC CE then contains the Timing Advance Command. This field indicates the index value $T_A$ (0, 1, 2 ... 63) used to control the amount of timing adjustment that MAC entity must apply as defined in REF3. The length of the field is 6 bits.

Figure 8:
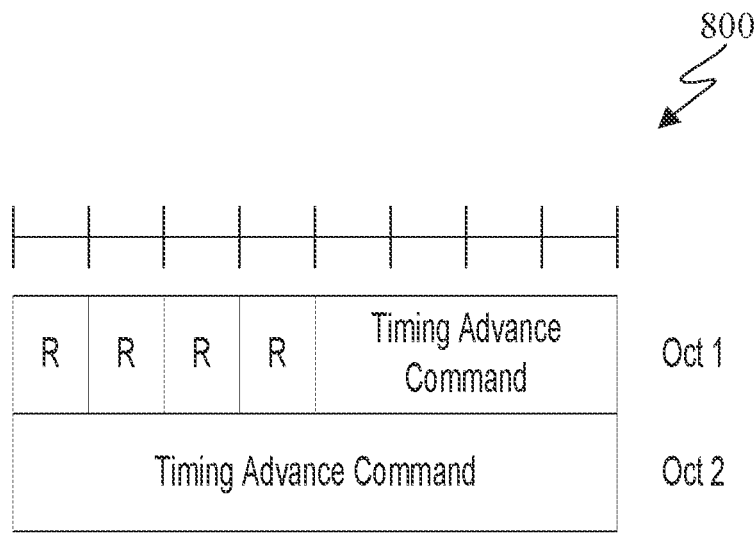
FIG. 8 illustrates an Absolute Timing Advance Command MAC CE according to embodiments of the disclosure.

FIG. 8 illustrates an Absolute Timing Advance Command MAC CE 800 according to embodiments of the disclosure. The embodiment of the Absolute Timing Advance Command MAC CE 800 illustrated in FIG. 8 is for illustration only. FIG. 8 does not limit the scope of this disclosure to any particular implementation of the Absolute Timing Advance Command MAC CE.

As illustrated in FIG. 8, the Absolute Timing Advance Command MAC CE is identified by MAC subheader with eLCID codepoint 252 as defined in REF5. It has a fixed size and consists of two octets. It contains the Timing Advance Command. This field indicates the index value TA used to control the amount of timing adjustment that the MAC entity must apply as defined in REF3. The size of the field is 12 bits. The 4 reserved bits R are set to 0.

NR UEs must have the capability to follow the frame timing changes of the reference cell in RRC_CONNECTED state. The UL frame transmission takes place $(N_{TA}+N_{TA\_offset}) \times T_c$ before the reception of the first detected path (in time) of the corresponding DL frame from the reference cell. For serving cell(s) in the Primary TAG, the UE uses the SpCell as the reference cell for deriving the UE transmit timing for cells in the Primary TAG. For serving cell(s) in the Secondary TAG, the UE can use any of the activated SCells as the reference cell for deriving the UE transmit timing for the cells in the Secondary TAG. There are UE initial transmit timing accuracy, gradual timing adjustment and timing advance adjustment delay requirements.

The UE initial transmission timing error must be less than or equal to $\pm T_e$ where the timing error limit value $T_e$ as defined in REF1 is shown in TABLE 1. This requirement applies when it is the first transmission in a DRX cycle for PUCCH, PUSCH and SRS, or it is the PRACH transmission, or it is the MsgA transmission. The UE must meet the $T_e$ requirement for an initial transmission provided that at least one SSB is available at the UE during the last 160 msec. The reference point for the UE initial transmit timing control requirement is the DL timing of the reference cell minus $(N_{TA}+N_{TA,offset}) \times T_c$. The DL timing is defined as the time when the first detected path (in time) of the corresponding DL frame is received from the reference cell. $N_{TA}$ for PRACH is defined as 0. $(N_{TA}+N_{TA,offset}) \times T_c$ (in $T_c$ units) for other channels is the difference between UE transmission timing and the DL timing immediately after when the last timing advance was applied. $N_{TA}$ for other channels is not changed until next timing advance is received. The value of $N_{TA,offset}$ is defined by REF1 is shown in TABLE 2. $N_{TA,offset}$ depends on the duplex mode of the cell in which the UL transmission takes place and the frequency range.

TABLE 1

Timing Error Limit $T_e$

| Frequency Range | SCS of SSB signals (kHz) | SCS of uplink signals (kHz) | $T_e$ |
|---|---|---|---|
| 1 | 15 | 15 | $12*64*T_c$ |
|   |    | 30 | $10*64*T_c$ |
|   |    | 60 | $10*64*T_c$ |
|   | 30 | 15 | $8*64*T_c$ |
|   |    | 30 | $8*64*T_c$ |
|   |    | 60 | $7*64*T_c$ |
| 2 | 120 | 60 | $3.5*64*T_c$ |
|   |     | 120 | $3.5*64*T_c$ |
|   | 240 | 60 | $3*64*T_c$ |
|   |     | 120 | $3*64*T_c$ |

Note 1:
$T_c$ is the basic timing unit defined in REF1

TABLE 2

Value of $N_{TA,\ offset}$

| Frequency range and band of cell used for uplink transmission | $N_{TA,\ offset}$ (Unit: $T_C$) |
|---|---|
| FR1 FDD or TDD band with neither E-UTRA-NR nor NB-IoT-NR coexistence case | 25600 (Note 1) |
| FR1 FDD band with E-UTRA-NR and/or NB-IoT-NR coexistence case | 0 (Note 1) |
| FR1 TDD band with E-UTRA-NR and/or NB-IoT-NR coexistence case | 39936 (Note 1) |
| FR2 | 13792 |

(Note 1):
The UE identifies $N_{TA,\ offset}$ based on the information n-TimingAdvanceOffset as specified in REF6. If UE is not provided with the information n-TimingAdvanceOffset, the default value of $N_{TA,\ offset}$ is set as 25600 for FR1 band. In case of multiple UL carriers in the same TAG, UE expects that the same value of n-TimingAdvanceOffset is provided for all the UL carriers according to REF3 and the value 39936 of $N_{TA,\ offset}$ can also be provided for a FDD serving cell.

When it is not the first transmission in a DRX cycle or there is no DRX cycle, and when it is the transmission for PUCCH, PUSCH and SRS transmission, the UE must be capable of changing the transmission timing according to the received DL frame of the reference cell except when the timing advance is applied.

When the transmission timing error between the UE and the reference timing exceeds $\pm T_c$ then the UE is required to adjust its timing to within $\pm T_c$. The reference timing is $(N_{TA}+N_{TA\ offset}) \times T_c$ before the DL timing of the reference cell. All adjustments made by the UE to the UL transmit timing must follow these rules:

- the maximum amount of the magnitude of the timing change in one adjustment is $T_q$;
- the minimum aggregate adjustment rate is $T_p$ per second;
- the maximum aggregate adjustment rate is $T_q$ per 200 ms.
- where the maximum autonomous time adjustment step $T_q$ and the aggregate adjustment rate $T_p$ as defined in REF1 are shown in TABLE 3.

TABLE 3

Maximum Autonomous Time Adjustment Step $T_q$ and Minimum Aggregate Adjustment Rate $T_p$

| Frequency Range | SCS of uplink signals (kHz) | $T_q$ | $T_p$ |
|---|---|---|---|
| 1 | 15 | $5.5*64*T_c$ | $5.5*64*T_c$ |
|   | 30 | $5.5*64*T_c$ | $5.5*64*T_c$ |
|   | 60 | $5.5*64*T_c$ | $5.5*64*T_c$ |
| 2 | 60 | $2.5*64*T_c$ | $2.5*64*T_c$ |
|   | 120 | $2.5*64*T_c$ | $2.5*64*T_c$ |

NOTE:
$T_c$ is the basic timing unit defined in REF1

When a UE operates in EN-DC, NR-DC, NE-DC or NR SA operation modes and receives a MAC CE that implies the adjustment of the timing advance as defined in REF5, the UE must adjust the timing of its UL transmission timing at time slot n+k+1 for a timing advance command received in time slot n, and where the value of k is defined by REF5. The relative accuracy of the adjustment for the signaled timing advance value when compared to the timing of the preceding UL transmission must be better than or equal to the UE Timing Advance adjustment accuracy requirement defined in REF1 and shown in TABLE 4.

TABLE 4

UE Timing Advance adjustment accuracy

| UL SCS (kHz) | 15 | 30 | 60 | 120 |
|---|---|---|---|---|
| UE Timing Advance adjustment accuracy | $\pm 256\ T_c$ | $\pm 256\ T_c$ | $\pm 128\ T_c$ | $\pm 32\ T_c$ |

Figure 9:
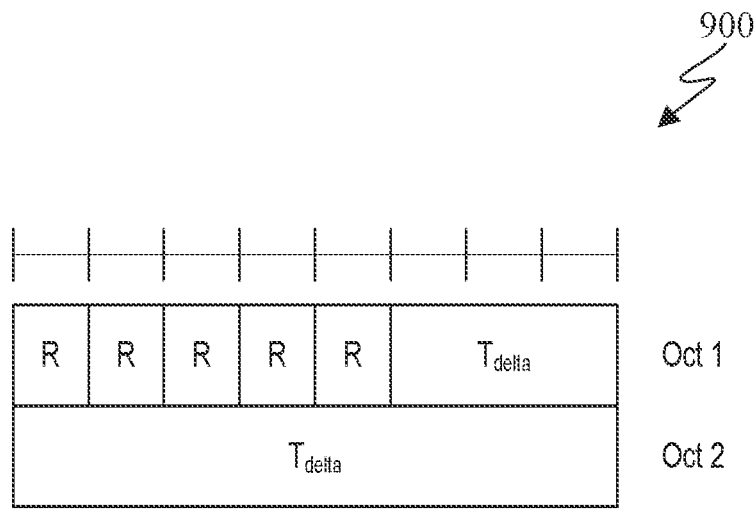
FIG. 9 illustrates a Timing Delta MAC CE according to embodiments of the disclosure.

FIG. 9 illustrates a Timing Delta MAC CE 900 according to embodiments of the disclosure. The embodiment of the Timing Delta MAC CE 900 illustrated in FIG. 9 is for illustration only. FIG. 9 does not limit the scope of this disclosure to any particular implementation of the Timing Delta MAC CE.

Rel-16 NR introduced support for the Integrated Access and Backhaul (IAB) feature. IAB-nodes are infrastructure relaying nodes capable of wirelessly relaying the uplink or downlink transmissions or receptions between UEs and gNBs. IAB operation can use NR or LTE radio in FR1 or FR2. In the context of Rel-16 IAB operation, there is an additional relative timing adjustment mechanism. For time-domain synchronization across multiple backhaul hops, an additional IAB timing adjustment $T_{delta}$ can be provided to the IAB node by its parent node. This parameter is applicable only to IAB nodes and signaled using the Timing Delta MAC CE shown in FIG. 9. The Timing Delta MAC CE is identified by MAC subheader with eLCID codepoint 255. It has a fixed size and consists of two octets. The 5 reserved bits R are set to 0. $T_{delta}$ indicates the value (0, 1, 2 ... 1199) used to control the amount of timing adjustment that MAC entity indicates and is defined in REF3. The length of the field is 11 bits.

If an IAB-node is provided an index $T_{delta}$ in a Timing Delta MAC CE from a serving cell, the IAB-node may assume that $(N_{TA}/2+N_{delta}+T_{delta}\ G_{step}) \cdot T_c$ is a time difference between a DU transmission of a signal from the serving cell and a reception of the signal by the IAB-MT when $N_{TA}/2+N_{delta}+T_{delta}\ G_{step}>0$. The IAB-node may use the time difference to determine an IAB-DU transmission time. $N_{TA}$ is obtained as for a "UE" in REF3 for the TAG containing the serving cell. $N_{delta}$ and $G_{step}$ are determined as:

$N_{delta}=-70528$ and $G_{step}=64$, for an FR1 serving cell providing the Timing Delta MAC CE, $N_{delta}=-17664$ and $G_{step}=32$, for an FR2 serving cell providing the Timing Delta MAC CE.

Rel-13 LTE introduced support for DL transmissions on an SCell in unlicensed bands, e.g., Licensed-Assisted Access (LAA). Rel-14 LTE then introduced support for UL transmissions on an SCell in unlicensed bands, e.g., Enhanced Licensed-Assisted Access (eLAA). Four additional new UL grant DCI formats were introduced by the Rel-14 eLAA feature in LTE: DCI Formats 0A, 0B, 4A and 4B.

DCI format 0A is used for the scheduling of PUSCH in a LAA SCell, or for activating/releasing an Autonomous UL transmission (AUL), or for indicating AUL DL feedback information (AUL-DFI) to a UE that is activated with AUL transmission. DCI format 0B is used for the scheduling of PUSCH in each of multiple subframes in an LAA SCell. DCI format 4A is used for the scheduling of PUSCH in a LAA SCell with multi-antenna port transmission mode. DCI format 4B is used for the scheduling of PUSCH with multi-antenna port transmission mode in each of multiple subframes in a LAA SCell.

When the Rel-14 LTE DCI format 0A is used for indicating AUL-DFI to a UE that is activated with AUL transmission, it includes a 16 bits HARQ-ACK bitmap and a 2 bits TPC command with the remaining bits set to zero. When DCI format 0A is used for the scheduling of PUSCH in a LAA SCell or for activating/releasing AUL transmission for a UE, it includes the fields Carrier indicator (0 or 3 bits), Flag for format0/format1A differentiation when the DCI is scrambled by C-RNTI, PUSCH trigger A (1 bit), Timing offset (4 bits), Resource block assignment (5 or 6 bits), Modulation and coding scheme (5 bits), HARQ process number (4 bits), New data indicator (1 bit), Redundancy version (2 bits), TPC command for scheduled PUSCH (2 bits), Cyclic shift for DM RS and OCC index (3 bits). CSI request (1-3 bits), SRS request (1 bit). PUSCH starting position (2 bits), PUSCH ending symbol (1 bit), Channel Access Type (1 bit), Channel Access Priority Class (2 bits).

DCI format 0A allows to signal to the UE an adjustable UL transmission timing offset for the PUSCH transmission on the LAA SCell. The PUSCH starting position field (2 bits) is used for this purpose. The UE first determines its UL transmission timing in terms of UL subframe and/or UL slot boundaries like in the case of the UL transmission on licensed bands, e.g., the UE determines the DL reference timing and adjusts its UL transmission timing by the signaled TA command from the gNB. The UE may autonomously perform TA adjustment according to TA transmit accuracy requirements. However, the gNB can then schedule the PUSCH transmission in the LAA SCell to start either exactly at the LTE subframe boundary, e.g., at the beginning of symbol 0 in the LTE subframe, or at 25 μs in symbol 0, or at (25+TA) μs in symbol 0 where TA is the UE timing advance value, or the PUSCH transmission can start only at symbol 1 (TABLE 5). A motivation is to allow the execution of the channel access procedure, e.g., LBT, prior to the UL transmission by the UE only after any preceding LTE LAA UL subframe transmission from other devices has been completed. In cases where a COT is shared between the DL and the UL, e.g., following successful gNB channel access in the DL, no UL LBT by the UE may be necessary and the PUSCH transmission may then start at the beginning of symbol 0 at the LTE subframe boundary. The gNB may also signal a PUSCH ending symbol (1 bit) using DCI format 0A where a value 0 indicates to the UE that PUSCH in the subframe can occupy up to the last symbol of the subframe and a value 1 indicates that PUSCH transmission must end in the second to last symbol of the LTE subframe.

Later LTE releases extend the principle of signalling the PUSCH starting and ending position through DCI format 0A to the case of per-slot instead of per-subframe scheduling, e.g., partial PUSCH operation. A PUSCH transmission can be scheduled only in the first or the second LTE slot in the LTE subframe. A signalled PUSCH starting position in the DCI format 0A can then indicate if the UE PUSCH transmission starts at symbol 0 (or 7), at 25 μs in symbol 0 (or 7), or at (25+TA) μs in symbol 0 (or 7) or can start only at symbol 1 (or 8). Although not shown, the DCI formats 0B, 4A and 4B also allow to signal the Rel-14 LTE PUSCH starting and ending position and Rel-15 LTE Partial PUSCH Mode like explained for the case of DCI format 0A when scheduling UL transmission on LAA SCell(s).

TABLE 5

LTE LAA PUSCH starting position

| Value | PUSCH starting position |
|---|---|
| 00 | symbol 0 |
| 01 | 25 μs in symbol 0 |
| 10 | (25 + TA) μs in symbol 0 |
| 11 | symbol 1 |

Figure 10:
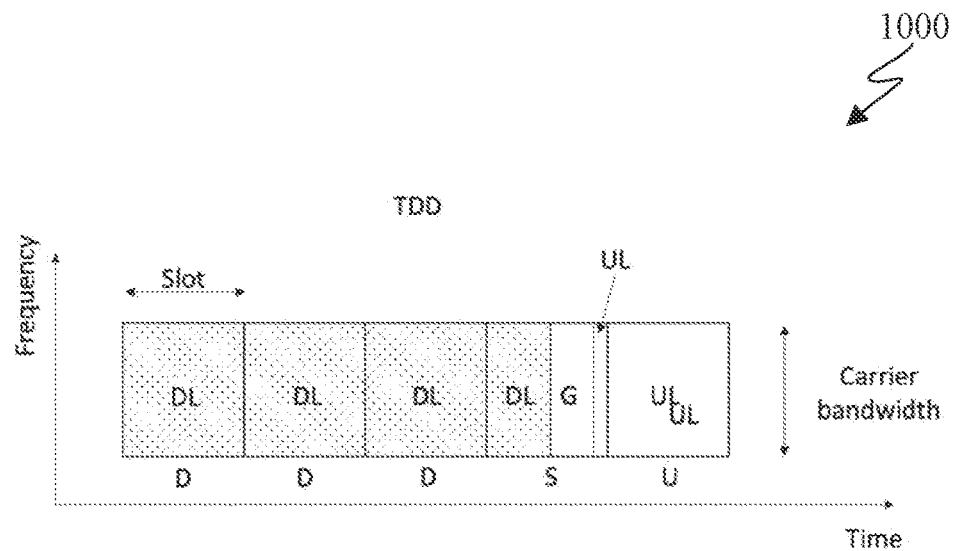
FIG. 10 illustrates an example TDD communication system according to embodiments of the disclosure.

FIG. 10 illustrates an example TDD communication system 1000 according to embodiments of the disclosure. The embodiment of the example TDD communication system 1000 illustrated in FIG. 10 is for illustration only. FIG. 10 does not limit the scope of this disclosure to any particular implementation of the example TDD communication system.

5G NR radio supports time-division duplex (TDD) operation and frequency division duplex (FDD) operation. Use of FDD or TDD depends on the NR frequency band and per-country allocations. TDD is required in most bands above 2.5 GHz. FIG. 10 illustrates an example structure of slots or single-carrier TDD UL-DL frame configuration for a TDD communications system according to the embodiments of the disclosure.

A DDDSU UL-DL configuration is shown, where D denotes a DL slot, U denotes an UL slot, and S denotes a special or switching slot with a DL part, a flexible part that can also be used as guard period G for DL-to-UL switching, and optionally an UL part.

TDD has several advantages over FDD. For example, use of the same band for DL and UL transmissions leads to simpler UE implementation with TDD because a duplexer is not required. Another advantage is that time resources can be flexibly assigned to UL and DL considering an asymmetric ratio of traffic in both directions. DL is typically assigned most time resources in TDD to handle DL-heavy mobile traffic. Another advantage is that channel state information (CSI) can be more easily acquired via channel reciprocity. This reduces an overhead associated with CSI reports especially when there are many antennas or antenna elements.

Although there are advantages of TDD over FDD, there are also disadvantages. A first disadvantage is a smaller coverage of TDD due to the usually small portion of time resources available for UL transmissions, while with FDD all time resources can be used for UL transmissions. Another disadvantage is latency. In TDD, a timing gap between DL reception and UL transmission containing the hybrid automatic repeat request acknowledgement (HARQ-ACK) information associated with DL receptions is typically larger than that in FDD, for example by several milliseconds. Therefore, the HARQ round trip time in TDD is typically longer than that with FDD, especially when the DL traffic load is high. This causes increased UL user plane latency in TDD and can cause data throughput loss or even HARQ stalling when a PUCCH providing HARQ-ACK information needs to be transmitted with repetitions to improve coverage (an alternative in such case is for a network to forgo HARQ-ACK information at least for some transport blocks in the DL).

To address some of the disadvantages for TDD operation, a dynamic adaptation of link direction has been considered where except for some symbols in some slots supporting predetermined transmissions such as for SSBs, symbols of a slot can have flexible transmission direction, e.g., DL or UL, which a UE can determine according to scheduling information for transmissions or receptions. A PDCCH can also be used to provide a DCI format, such as a DCI format 2_0 as described in REF2 and REF3, that can indicate a link direction of some flexible symbols in one or more slots. Nevertheless, in actual deployments, it is difficult for a gNB scheduler to adapt a transmission direction of symbols without coordination with other gNB schedulers in the network. This is because of cross-link interference (CLI) where, for example, DL receptions in a cell by a UE can experience large interference from UL transmissions in the same or neighboring cells from other UEs.

Full-duplex (FD) communications offer a potential for increased spectral efficiency, improved capacity, and reduced latency in wireless networks. When using FD communications, UL and DL signals are simultaneously received and transmitted on fully or partially overlapping, or adjacent, frequency resources, thereby improving spectral efficiency and reducing latency in user and/or control planes.

There are several options for operating a full-duplex wireless communication system. For example, a single carrier may be used such that transmissions and receptions are scheduled on same time-domain resources, such as symbols or slots. Transmissions and receptions on same symbols or slots may be separated in frequency, for example by being placed in non-overlapping sub-bands. An UL frequency sub-band, in time-domain resources that also include DL frequency sub-bands, may be allocated in the center of a carrier, or at the edge of the carrier, or at a selected frequency-domain position of the carrier. The allocations of DL sub-bands and UL sub-bands may partially or fully overlap. A gNB may simultaneously transmit and receive in time-domain resources using same physical antennas, antenna ports, antenna panels and transmitter-receiver units (TRX). Transmission and reception in FD may also occur using separate physical antennas, ports, panels, or TRXs. Antennas, ports, panels, or TRXs may also be partially reused, or only respective subsets can be active for transmissions and receptions when FD communication is enabled.

Instead of using a single carrier, it is also possible to use different component carriers (CCs) for receptions and transmissions by a UE. For example, receptions by a UE can occur on a first CC and transmissions by the UE occur on a second CC having a small, including zero, frequency separation from the first CC.

Furthermore, a gNB can operate with full-duplex mode even when a UE still operates in half-duplex mode, such as when the UE can either transmit and receive at a same time, or the UE can also be capable for full-duplex operation.

Full-duplex transmission/reception is not limited to gNBs, TRPs, or UEs, but can also be used for other types of wireless nodes such as relay or repeater nodes.

Full duplex operation needs to overcome several challenges to be functional in actual deployments. When using overlapping frequency resources, received signals are subject to co-channel cross-link interference (CLI) and self-interference. CLI and self-interference cancellation methods include passive methods that rely on isolation between transmit and receive antennas, active methods that utilize RF or digital signal processing, and hybrid methods that use a combination of active and passive methods. Filtering and interference cancellation may be implemented in RF, baseband (BB), or in both RF and BB. While mitigating co-channel CLI may require large complexity at a receiver, it is feasible within current technological limits. Another aspect of FD operation is the mitigation of adjacent channel CLI because in several cellular band allocations, different operators have adjacent spectrum.

Throughout the disclosure, Cross-Division-Duplex (XDD) is used as a short form for a full-duplex operation. The terms "XDD" and "full-duplex" are interchangeably used in the disclosure.

Full-duplex operation in NR can improve spectral efficiency, link robustness, capacity, and latency of UL transmissions. In an NR TDD system, UL transmissions are limited by fewer available transmission opportunities than DL receptions. For example, for NR TDD with SCS=30 kHz, DDDU (2 msec), DDDSU (2.5 msec), or DDDDDDD-SUU (5 msec), the UL-DL configurations allow for an DL:UL ratio from 3:1 to 4:1. Any UL transmission can only occur in a limited number of UL slots, for example every 2, 2.5, or 5 msec, respectively.

Figure 11:
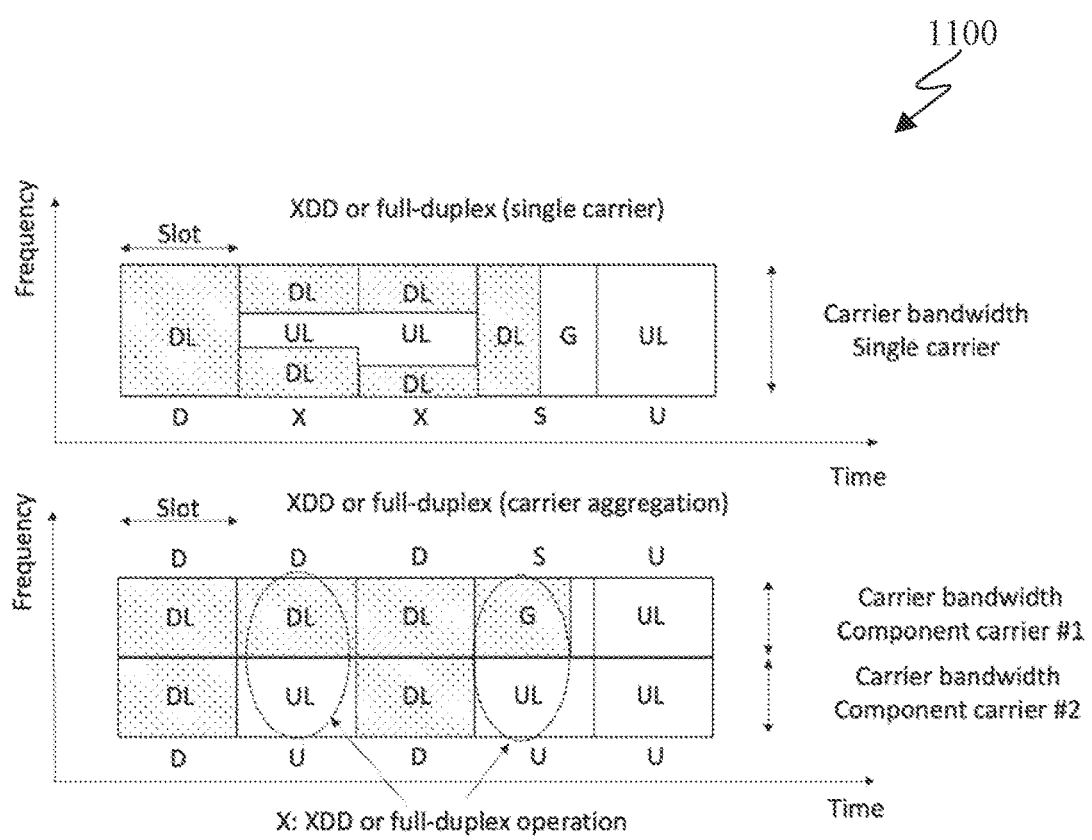
FIG. 11 illustrates two example full-duplex communication system configurations according to the embodiments of the disclosure.

FIG. 11 illustrates two example full-duplex communication system configurations 1100 according to the embodiments of the disclosure. The embodiment of the example full-duplex communication system configurations 1100 illustrated in FIG. 11 is for illustration only. FIG. 11 does not limit the scope of this disclosure to any particular implementation of the example full-duplex communication system configurations.

For a single carrier TDD configuration with full-duplex enabled, slots denoted as X are full-duplex or XDD slots. Both DL and UL transmissions can be scheduled in XDD slots for at least one or more symbols. The term XDD slot is used to refer to a slot where UEs can simultaneously both receive and transmit in at least one or more symbols of the slot if scheduled or assigned radio resources by the base station. A half-duplex UE cannot both transmit and receive simultaneously in an XDD slot or on a symbol(s) of an XDD slot. When a half-duplex UE is configured for transmission in symbols of an XDD slot, another UE can be configured for reception in the symbols of the XDD slot. A full-duplex UE can transmit and receive simultaneously in symbols of an XDD slot, possibly in presence of other UEs scheduled or assigned resources for either DL or UL in the symbols of the XDD slot. Transmissions by a UE in a first XDD slot can use same or different frequency-domain resources than in a second XDD slot, wherein the resources can differ in bandwidth, a first RB, or a location of the center carrier.

For a dual-carrier (carrier aggregation) TDD configuration with full-duplex enabled, a UE receives in a slot on CC #1 and transmits in at least one or more symbol(s) of the slot on CC #2. In addition to D slots used only for transmissions/receptions by a gNB/UE, U slots used only for receptions/transmissions by the gNB/UE, and S slots for also supporting DL-UL switching, full-duplex slots with both transmissions/receptions by a gNB or a UE that occur on same time-domain resources, such as slots or symbols, are labeled by X. For the example of TDD with SCS=30 kHz, single carrier, and UL-DL allocation DXXSU (2.5 msec), the second and third slots allow for full-duplex operation. UL transmissions can also occur in a last slot (U) where the full UL transmission bandwidth is available. XDD slots or symbol assignments over a period of time and/or a number of slots or symbols can be indicated by a DCI format in a PDCCH reception and can then vary per unit of the time period, or can be indicated by higher layer signaling, such as via a MAC CE or RRC.

In NR TDD network deployments, the choice of the UL-DL frame configuration impacts the relative capacity split between DL and UL, the achievable DL and UL latencies for data and control signaling, and the maximum cell radius. A Guard Period (GP) with no scheduled DL or UL transmissions is required to separate the DL and UL allocations in the TDD system. The duration of the GP measured in microseconds defines a safety zone distance beyond which the DL and UL will start overlapping and interfere each other even if the TDD network is perfectly synchronized. Dimensioning of the safety zone distance in TDD networks first accounts for deployment and signal propagation aspects. At the speed of light, the radio waves travel 300 m in 1 µs. To achieve a 15 km safety range, about 50 µs GP would be required from when the transmitter switches off to when the receiver is switched on. If a 40 km safety zone is required, a 134 µs GP would be necessary.

In LTE TDD networks, the duration of GPs is provided through the selection of up to 9 different Special Subframe formats. In NR TDD networks, the slot formats defined in REF3 provide the number of guard symbols. The dimensioning for the safety distance provided by the choice of the GP duration must also consider transient periods for switching off the transmitter as well as the timing advance offset. Both these factors reduce the practical safety range obtained from accounting for BTS-to-BTS propagation and signal attenuation in the TDD deployment. A greater GP allows for larger safety zones and allows to better tolerate network and UE side timing alignment errors, but it comes at the cost of capacity and peak throughput. For example, for SCS=30 kHz with DDDSU and a GP of 5 symbols provided by the NR slot format in the Special Slot, a 50 km safety zone is dimensioned, but it costs around 7% of the system capacity. For SCS=30 kHz, typical settings in NR TDD macro networks for the number of guard symbols are 2 or 4. Controlling the UE timing advance is an important mechanism in TDD networks to avoid UL-to-DL or DL-to-UL interference given the provided duration of the GP to separate DL and UL transmission periods.

When considering NR TDD networks with support for full-duplex or XDD operation, proper timing control and determination of the UL transmit timing become significantly more challenging due to the addition of more UL-to-DL and DL-to-UL interference paths during system operation.

Figure 12:
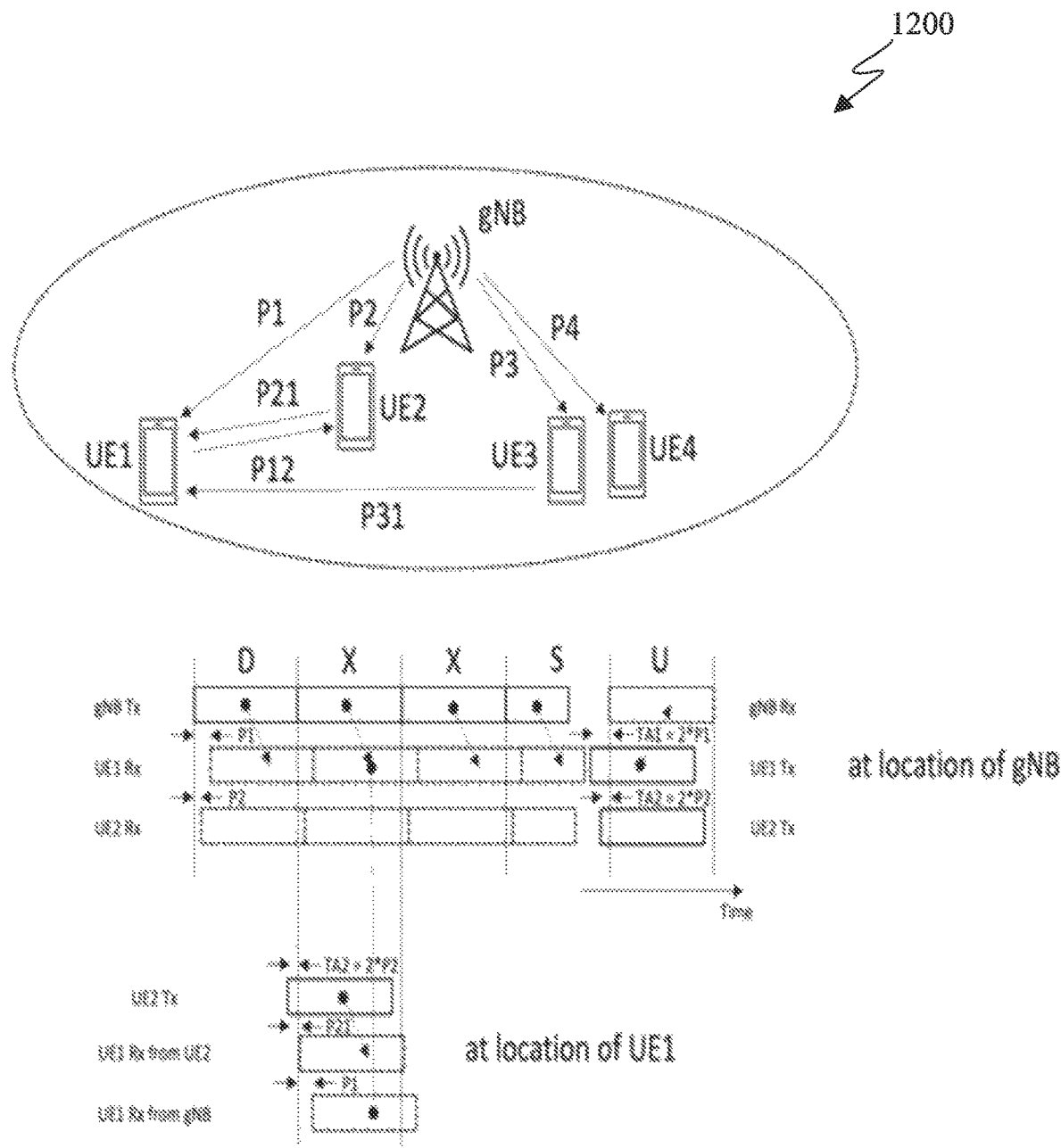
FIG. 12 illustrates Tx and Rx timings in a full-duplex communications system according to the embodiments of the disclosure.

FIG. 12 illustrates Tx and Rx timings in a full-duplex communications system 1200 according to the embodiments of the disclosure. The embodiment of the example Tx and Rx timings in a full-duplex communications system 1200 illustrated in FIG. 12 is for illustration only. FIG. 12 does not limit the scope of this disclosure to any particular implementation of the example Tx and Rx timings in a full-duplex communications system.

In FIG. 12, the NR TDD gNB uses SCS=30 kHz and a UL-DL frame allocation of type a DDDSU with duration 2.5 msec. UE1, UE2, UE3 and UE4 are served by gNB. Note that the timing advance settings TA1, TA2, TA3, TA4 for UE1, UE2, UE3, UE4 are determined based on the respective UE distances to gNB. Transmissions and receptions from the gNB to UE1, UE2, UE3, UE4 are subject to one-way propagation delays P1, P2, P3, P4, respectively. Full-duplex communication is supported by the gNB and enabled for the 2nd and $3^{rd}$ slot, e.g., DXXSU. Full-duplex communication in the TDD cell uses frequency-orthogonal subbands, e.g., DL transmissions from the gNB to a UE and UL reception from a UE by the gNB do not overlap in frequency domain. UL transmissions in full-duplex slots can be allocated to the center subband in the $2^{nd}$ and $3^{rd}$ slot. UE1-UE4 operate half-duplex, e.g., they can either transmit or receive in a slot, but no simultaneous DL reception and UL transmission from a same UE can occur in a slot. The small relative distance from UE1 to gNB results in a small TA1 value. UE2 is further away from gNB and requires a larger TA2 value. UE3 and UE4 require timing advance values with TA1<TA3<TA4<TA2.

FIG. 12 shows the relative Tx and Rx timings of transmissions for 2 cases, first when received at the gNB location and second when received at the location of UE1. Interfering UL transmissions from UE2 in the $2^{nd}$ XDD slot are received by UE1 earlier than DL transmissions from the gNB in the slot. UL transmissions from UE2 interfere not only the PDSCH simultaneously transmitted by the gNB to UE1 in the 2nd slot, but also the symbols carrying PDCCH at the beginning of the $2^{nd}$ slot. Arrival time of the interfering UL transmission from UE2 at the location of UE1 during DL reception by UE1 in the $2^{nd}$ slot is determined by 3 relative one-way propagation delays, e.g., UE2-gNB (P2), UE1-gNB (P1) and UE2-UE1 (P21). Note that UL-DL interference in the $2^{nd}$ slot occurs even with subband full-duplex operation. The roll-off of the filtered Tx OFDM BB waveform from UE2 creates leakage across the entire channel BW including the DL subband(s) used for DL reception by UE1. Guard RBs or guard tones between the UL and DL subband(s) in the 2nd slot can mitigate, but not fully eliminate leakage created by the UL-to-DL interference from UE2 UL transmissions. The amount of leakage and their impact on UE1 demodulation performance depends on the DL receive power levels of the desired DL signal and the interfering UL signal which are a function of the gNB DL transmit power or EPRE, the distance between gNB and UE1, the UE2 UL transmit power or EPRE, the distance between UE2 and UE1 and the amount of Tx and/or Rx filtering by UE1 and UE2.

Although not shown in FIG. 12, UE-to-UE or UL-to-DL interference during full-duplex operation can also affect the subsequent, e.g., $3^{rd}$ XDD slot. When UE2 is closer to the gNB, it uses a smaller TA2 value. Interfering UL transmissions from UE2 in the $2^{nd}$ slot will then be received later by UE1 than the DL transmissions from the gNB for a sufficiently large P21. Interference from UL transmissions by UE2 in the $2^{nd}$ slot will then affect the first received symbol(s) of the $3^{rd}$ slot received by UE1.

When considering transmissions in a full-duplex capable communication system several issues of existing state-of-the-art technology need to be overcome.

A first issue relates to the timing advance procedure in a TDD cell supporting full-duplex operation. The existing TA procedure controls the UE UL transmit timing with respect to the propagation delay of the UE to the gNB. The purpose of the existing timing advance procedure is to align the receive timings of multiple UL signals transmitted by multiple UEs at the location of the gNB, e.g., ideally within a CP. For example, the gNB can set the timing advance values TA1=2*P1 for UE1 and TA2=2*P2 for UE2 to align the receive timings of UL signals transmitted by UE1 and UE2 in a normal UL slot as illustrated in FIG. 12. It can then be shown that the interfering UL signal transmitted by UE2 in the 2nd XDD slot is received by UE1 with a relative timing difference $\Delta_{21}$=P1+P2-P21 when compared to the desired DL signal from the gNB. If UE1 is scheduled to transmit the UL signal in the $2^{nd}$ XDD slot and UE2 is scheduled DL reception instead, UE2 would experience a timing difference 412=P2+P1-P12.

Under the assumptions that P12=P21 and TA1=2*P1 and TA2=2*P2, the following observations can be made. First, the value of $\Delta_{21}$ and $\Delta_{12}$ is the same, e.g., the pair UE1 and UE2 experiences the same relative timing difference of the interfering UL signal with respect to the desired DL signal. If UE1 receives in the DL and UE2 transmits in the UL or if UE2 receives in the DL and UE1 transmits in the UL, the resulting relative timing difference values are the same. Second, the relative timing difference is largest when P12=P21=0, e.g., UE1 and UE2 are co-located (or at least very close). $\Delta_{21}$=$\Delta_{12}$=TA1=TA2. Third, even at non-zero distances of UE1 and UE2 from the gNB, the relative timing difference can become 0 when P1+P2=P12 (or =P21). Fourth, another pair of UE3 and UE4 would experience a different value for their relative timing difference $\Delta_{34}$=$\Delta_{43}$ when allocated for DL reception and UL transmission in the 3rd XDD slot. Fifth, if UE3 and UE2 were both to transmit their UL in the $2^{nd}$ XDD slot while UE1 receives a DL signal from the gNB, the values of the relative timing differences $\Delta_{21}$ and $\Delta_{31}$ would be different, because they depend on the one-way propagation delays of UE1 (P1), UE2 (P2) and UE3 (P3) with respect to the gNB, and the relative distances UE2-UE1 (P21) and UE3-UE1 (P31). When UL signals from multiple UEs are simultaneously transmitted in the XDD slot, the received DL signal is subjected to interference with a spread of relative timing differences with respect to the interfering UL signals. Note that the relative timing difference value(s) in the full-duplex slot will change more rapidly than the values of the one-way propagation delays with UE movement because of the presence of the one-way delay terms P21 and P31. Sixth, when the gNB sets TA2=2*P2 and TA3=2*P3 for UE2 and UE3, their UL transmissions in both the normal UL slot and the XDD slot will still be received time-aligned by the gNB at the gNB location. Seventh, when TA1≠2*P1 and/or TA2≠2*P2, e.g., when one-way propagation delay is not perfectly compensated through the gNB controlled timing advance procedure, then $\Delta_{21}$≠$\Delta_{12}$. Full-duplex scheduling is not reciprocal anymore with respect to the relative timing difference experienced by UE1 and UE2 for the 2nd XDD slot. Note that UE-autonomous adjustment of the UE maintained timing advance value to meet the reference timing within the allowed timing error limit is integral part of existing TA procedures when tracking the first detected path (in time) of a DL frame from the serving cell. The UE will adjust its maintained $N_{TA}$ value autonomously. After the random access procedure where the absolute timing advance value is provided to the UE by the gNB during initial access, the gNB often does not know the exact current value of $N_{TA}$ which is maintained by the UE locally and not communicated back to the gNB. The gNB can only know the sequence of MAC CE timing commands $T_A$ which it has previously issued to the UE in RRC_CONNECTED mode.

The relative timing difference experienced by a receiving UE in the DL subband of an XDD slot will often be larger than the CP where a CP has a duration of 4.7 us (or 2.3 us) for an SCS=15 (or 30 kHz). In consequence, the provisioning of guard symbols for PDCCH, PDSCH, PUCCH and/or PUSCH transmission and reception becomes necessary to protect the DL and/or UL channels or signals from unwanted UE-to-UE interference in the full-duplex slots. This is detrimental to spectral efficiency and penalizes the DL and/or UL throughputs in TDD cells supporting full-duplex transmissions.

Existing technology, e.g., LTE and NR, relies on the use of an UL transmit timing procedure controlled by the gNB. The UE assumes that the DL symbol, slot, and frame boundaries follow a constant transmission schedule once the UE determines the DL reference timing using received DL signal measurements. For example, in NR, the reference point for the UE to determine the DL reference timing is defined as the time when the first detected path (in time) of the corresponding DL frame is received from the reference cell. Usually, DL reference timing is determined by the UE using SSB measurements. The UL transmission timing from the UE is then controlled by the gNB using timing advance commands, e.g., a negative transmission time offset with respect to the DL reference timing determined by the UE between the start of a DL slot as observed by the UE and the start of a corresponding UL slot. When full-duplex operation is enabled in the serving cell, the relative timing difference between received desired DL signals from the gNB and the received undesired UL transmissions from interfering UEs experienced by a receiving (victim) UE in the DL subband of full-duplex slot can be controlled by several means when the UL transmit timing procedure is functionally modified. For example, adjustable UL transmit timing adjustment values $N_{delta}$ can configured for a UE operating in a full-duplex serving cell. For example, multiple TAGs (or Timing Slot Groups) on a serving cell with full-duplex transmissions can be configured for the UE.

In the context of full-duplex operation on a serving cell, the use of the UE UL transmit timing procedure is at least necessary to control the receive timings of the UL signals transmitted from one or multiple UEs at the gNB location. Relying on the use of the existing UE UL transmit timing procedure to control the relative timing difference between received desired DL signals from the gNB and the received undesired UL transmissions from interfering UEs experienced by a receiving (victim) UE in the DL subband of a full-duplex slot is insufficient in several cases.

For example, UE implementations in FR2 can support full-duplex operation, e.g., simultaneous transmission and reception by the UE in a symbol or slot through SDM with sufficient spatial separation and/or orientations of a first receive antenna panel and a second transmit antenna panel. These full-duplex capable UE implementations can use a shared BB which is used simultaneously for the processing of the transmission and the reception paths in the UE modem, or they can use separate dedicated BB processing units, e.g., one for the transmission path and another one for the reception path. UE full-duplex implementations using a shared BB are less costly, result in less die area and present many other advantages such as reduced UE modem power consumption. However, a prerequisite to support shared BB operation in the UE implementation is sample or symbol aligned transmission and reception timings at the UE during full-duplex operation, e.g., DL reception of a symbol and UL transmission of a symbol must occur time-aligned, e.g., ideally aligned to sample level. This means that DL symbols received by the UE in a full-duplex slot should use the same symbol timings as UL symbols transmitted by that same UE during full-duplex operation. This is not possible using existing state-of-the-art technology, because the UL transmissions of a symbol from the UE typically start earlier than DL reception of a corresponding symbol by that same UE due to UL timing advance. A solution is needed to align the reception timing of DL transmissions from the gNB with the UE UL transmission timing to efficiently support full-duplex UE implementations.

In another example, a half-duplex UE implementation such as in FR1 is considered. The half-duplex UE can either transmit or receive at a same time when operating in a serving cell supporting full-duplex operation. To control the relative timing difference between received desired DL signals from the gNB and the received undesired UL transmissions from interfering UEs experienced by a receiving (victim) UE in the DL subband of a full-duplex slot, gNB-side and/or UE-reported measurements can be used. For example, UE-transmitted SRS and/or measurements reported from one or multiple UE(s) using the cross-link interference management reporting feature may be used by the gNB to determine and adjust the UL transmit timing setting(s) of a UE in the full-duplex and/or normal UL slot(s) of a serving cell. To control, e.g., minimize the relative timing difference experienced by the receiving (victim) UE in the DL part of a full-duplex slot, either the UL transmission timing of the interfering UE or the DL reception timing of the victim UE can be adjusted. When only a single UL transmit timing procedure is supported by the interfering UE such as is the case for legacy UEs, e.g., a single TA loop and a single timing advance offset is applicable to all slots of the serving cell and must be used for the determination of the UL transmit timing by the interfering UE. There is therefore no means to control the relative timing difference experienced by the victim UE in the full-duplex slot. A solution is highly desirable to control and adjust the reception timing of DL transmissions from the gNB when legacy UEs are scheduled for UL transmissions in the full-duplex slots. The solution for this case must therefore rely on the adjustment of the reception timing of DL transmissions to the victim UE for which existing state-of-the-art provides no solution.

In a related example, another consideration is that NR gNBs heavily rely on the use of dynamic scheduling. gNB schedulers typically account for channel conditions at the device including spatial-domain properties, buffer status of the different data flows, priorities of the different data flows, including the amount of data pending retransmission and the interference situation in neighboring cells. When the gNB supports full-duplex operation, the gNB additionally schedules the DL subband(s) for receptions by UEs and UL subband(s) for transmissions from UEs by selecting a suitable subset of UEs from a list of possible UE candidate DL-UL pairings. Which combination(s) of UE DL-UL pairings for simultaneous DL receptions by UEs and UL transmissions from UEs are deemed suitable in a full-duplex slot first depends on their spatial separation, e.g., the achievable radio isolation between these UEs when assuming the UL transmission from a paired UE will impact not only reception of the UL transmission at the gNB reception site, but also the DL receptions by other UEs in the full-duplex slot. The possibility of a choice for pairing UEs in a full-duplex slot secondly depends on the availability of schedulable DL and UL traffic for those UEs. There may not be data or control to be transmitted or received for both UEs in the given transmission interval, e.g., the full-duplex slot, even if the UEs otherwise qualify for pairing in terms of the spatial isolation budget. Maintaining appropriate UL transmit timing settings suitable to control and adjust the relative timing difference experienced by a victim (DL) UE for all possible UEs pairings from the set of candidate UE DL-UL pairings for the full-duplex slots when scheduled is complex to implement in the gNB if only the UL transmission timing of UEs can be controlled. It is a simpler and less complex solution for the gNB to implement when the DL transmission timing to the victim UE is adjusted to reduce the receive timing difference experienced by the victim UE once a suitable subset of scheduled UEs from a list of possible schedulable UE candidate DL-UL pairings has been selected by the gNB scheduler. Additionally, the DL transmission timing by the gNB and accordingly, the DL reception timing by the victim UE can be adjusted dynamically by the gNB. Adjustments to the DL transmission timing can be done by the gNB on a very fast time scale, e.g., in the order of milliseconds or less. The maintenance and control by the gNB of the UE UL transmission timing however is a much slower process because it must operate at the time scale of hundreds of milliseconds due to inherent delays in measurement averaging and reporting and the delays resulting from signaling and the application of the timing advance command or related RRC parameters. Therefore, a solution to adjust the reception timing of DL transmissions from the gNB to the victim UE is desired for which existing state-of-the-art provides no solution.

Existing technology allows signaling by DCI of the time-domain resource allocation for PDSCH and/or PUSCH data to be received or transmitted in NR. A similar feature also exists in later LTE releases, e.g., eMTC or LTE-M. NR has adopted an approach based on configurable tables. The time-domain resource assignment field in the DCI, e.g., DCI F1_1, F1_2, F0_1, F0_2 is used as an index into an RRC configured table provided by parameter pdsch-TimeDomainAllocationList (for PDSCH) or pusch-TimeDomainAllocationList (for PUSCH). There is one RRC configured table for UL scheduling grants and one table for DL scheduling assignments. In Rel-15 NR each table can be configured with 16 rows and in Rel-16 up to 64 rows. Each row in the table at least contains a slot offset, that is, the PDSCH (or PUSCH) slot relative to the one where the DCI was obtained. In Rel-15 NR slot offsets from 0 to 3 are possible in the DL (or from 0 to 7 in the UL). Each row configures the first OFDM symbol in the slot where the data are transmitted and the duration of the data transmission in number of OFDM symbols in the slot. Not all combinations are allowed. In the DL, each row configures the PDSCH mapping type. Rel-16 NR allows to configure additional columns in the RRC time-domain resource allocation tables. For example, when operating in unlicensed bands, multi-slot PUSCH allocations can be configured. For example, for URLLC, a column indicating the number of times a transmission should be repeated can be configured. Default tables from system specifications providing the time-domain resource allocation for PDSCH and/or PUSCH defined in REF4 may be used when scheduling the system information or in cases where typical allocations for user data transmission or reception are sufficient.

In the context of full-duplex operation, the existing NR time-domain resource allocation mechanism based on the use of the time-domain resource assignment field signaled by the DCI providing an index into the RRC configured time-domain resource allocation table(s) for PDSCH and PUSCH or a default table provided by REF4 for purpose of overcoming the described shortcomings in full-duplex systems is insufficient. The existing NR time-domain resource allocation must operate on a per-symbol level, e.g., the PDSCH or PUSCH allocations in a slot can be configured and indicated by the scheduling DCI in a flexible manner, but only with a time-domain resolution of one OFDM symbol. For example, a PDSCH transmission can start either at the symbol 0 boundary of a slot, or at symbol 1, but the PDSCH transmission cannot start with ½ symbol offset compared to the slot boundary using the existing NR time domain resource allocation (TDRA) configurations. For purpose of transmission timing control in a serving cell supporting full-duplex operation however, transmission timing must be controlled with sub-symbol resolution. Note that the parameterization of the existing NR UE UL transmit timing procedure for example results in a timing advance step size of approximately 0.52 pec for SCS=15 kHz and around 9 adjustments intervals for CP alignment. For higher SCS, this number of adjustment intervals per CP is preserved due to the scaling of the NR timing advance step size as a function of the SCS. DL transmission timing control in the context of full-duplex operation of the serving cell must be able operate at least at this same time-domain resolution.

In summary, solutions to adjust the DL transmission timing in TDD networks supporting full-duplex operation are desired for which existing state-of-the-art provides no solution.

The disclosure addresses the above issues and provides additional design aspects for support of transmission timing, and provides solutions as fully elaborated in the following. The disclosure considers methods using configurable receive timing adjustment values signaled to the UE by means of DCI, MAC CE and/or RRC. The UE adjusts its DL reception timing in a slot compared to the DL reference timing.

The UE is provided with a configurable receive timing adjustment value $N_{delta}$ allowing to adjust the DL Rx timing in a slot with respect to the DL reference timing of the serving cell. A receive timing adjustment value $N_{delta}$ may be associated with a DL signal/channel of type PBCH, PDCCH, PDSCH and/or a primary synchronization signal (PSS), a secondary synchronization signal (SSS), demodulation reference signal (DMRS), channel state information-reference signal (CSI-RS), a phase tracking reference signal (PTRS). The slot or symbol number for the transmission may be indicated for simultaneous transmission and reception during a same time-domain resource on a cell, not indicated for simultaneous transmission and reception during a same time-domain resource on the cell. The slot or symbol type may be one of a DL type, a flexible (F) type, or an uplink (UL) type and/or one of subband full duplex (SBFD) or non-SBFD, A value of the receive timing adjustment $N_{delta}$ may be provided for a slot or a same $N_{delta}$ value may be configured for multiple slots. A value of the receive timing adjustment $N_{delta}$ may be associated with a transmission duration or validity period during which the receive timing adjustment $N_{delta}$ may be assumed the same by the UE. Different DL signal(s)/channel(s) may have a different associated transmission durations or validity periods, or a same transmission duration or validity period may be assumed by the UE. A same receive timing adjustment value $N_{delta}$ may be provided for multiple UEs to determine their DL receive timings in a slot, or different $N_{delta}$ values may be provided for different UEs. The determination of a second receive timing adjustment value $N_{delta,2}$ by the UE may depend on and be a function of a first provided receive timing adjustment value $N_{delta,1}$, e.g., the UE determines $N_{delta,2}$ as relative value compared to or as offset to $N_{delta,1}$. $N_{delta}$ value(s) including their associated slot(s), DL signal(s)/channel(s) and/or validity period(s) may be provided to a UE by one or a combination of L1 control signaling by DCI, RRC signaling (e.g., a RRC information field) and/or configuration, tabulated and/or listed by system operating specifications, or MAC CE signaling. If a same receive timing adjustment $N_{delta}$ value is provided for multiple UEs, a common DCI or common RRC signaling message may be used. A UE-specific DCI or RRC signaling of dedicated or common type may be used to provide value(s) of $N_{delta}$ to a UE. Only a first receive timing adjustment value $N_{delta,1}$ associated with a first DL transmission may be provided to the UE by DCI whereas a second receive timing adjustment value $N_{delta,2}$ associated with a second DL transmission may be determined by the UE by RRC configuration, MAC CE signaling or from system specifications. $N_{delta}$ value(s) provided to the UE by RRC signaling may be used in conjunction with MAC CE provided $N_{delta}$ values. A timing adjustment value $N_{delta}$ associated with the DL reception timing of a DL signal/channel on a serving cell may be determined by the UE by means of providing an index value through DCI signaling and the UE selecting one or more entries from an RRC configurable table using the provided index value. The UE may determine a default value for the receive timing adjustment $N_{delta}$ associated with a DL signal/channel or in a DL slot. A timing reference signal may be configured for the UE with respect to which the DL reference timing of the serving cell is determined by the UE and/or the configurable receive timing adjustment value $N_{delta}$ is applied by the UE for a reception of a DL signal/channel. One or more timing reference signals may be configured for the UE. A timing reference signal may be provided as TCI state(s) or RS resource index(es) corresponding to an SSB or to a CSI-RS resource index. A (DL) timing reference signal may be configured for the UE to determine its UL transmission timing.

Figure 13:
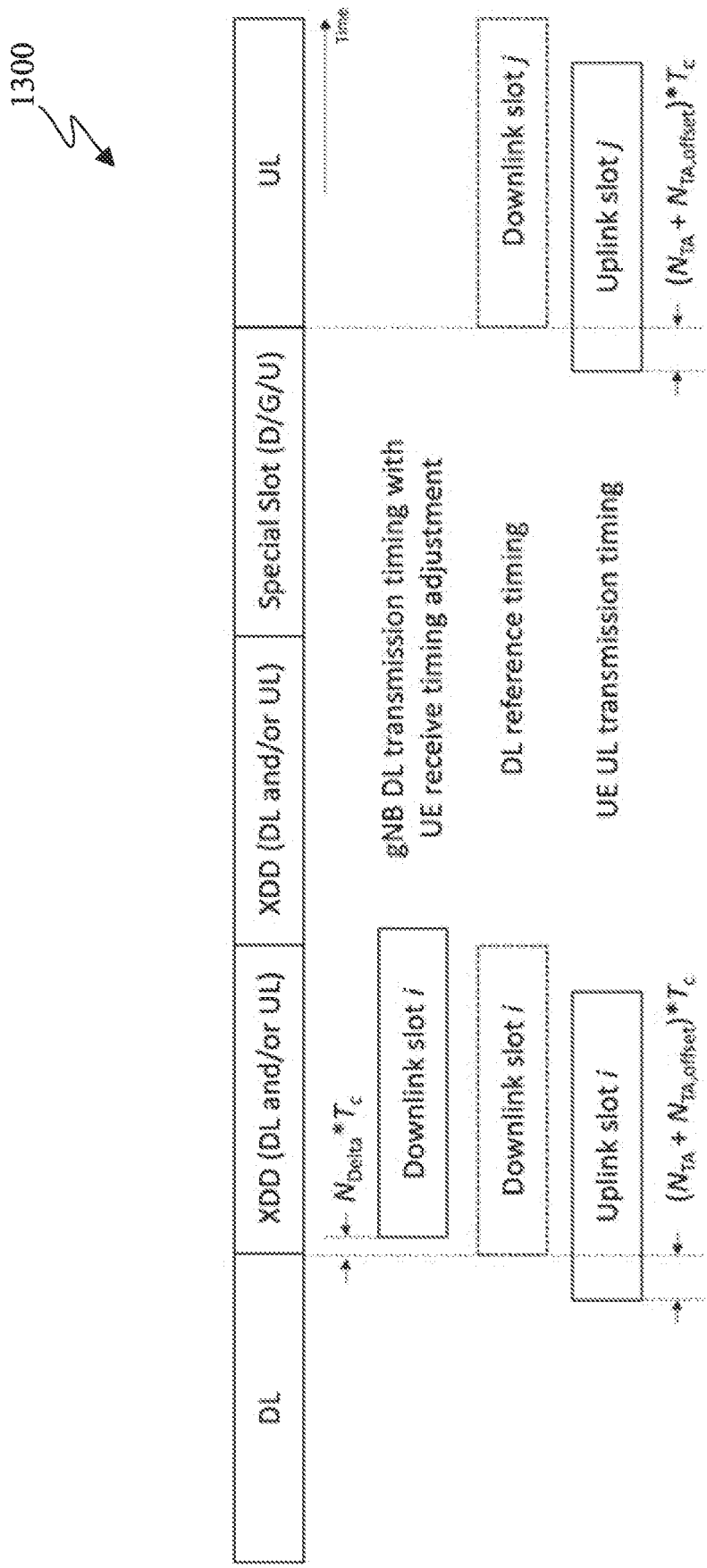
FIG. 13 illustrates UL-DL timing relations with a receive timing adjustment according to the embodiments of the disclosure.

FIG. 13 illustrates UL-DL timing relations with a receive timing adjustment 1300 according to the embodiments of the disclosure. The embodiment of the UL-DL timing relations with a receive timing adjustment 1300 illustrated in FIG. 13 is for illustration only. FIG. 13 does not limit the scope of this disclosure to any particular implementation of the example UL-DL timing relations with a receive timing adjustment.

The UE is provided with a receive timing adjustment value $N_{delta}$ allowing to adjust its DL Rx timing in a slot with respect to the DL reference timing of the serving cell. As shown in FIG. 13, DL transmission from the gNB to the UE in slot number i starts at $N_{Delta}*T_c$ after the start of the DL reference timing of the serving cell where $T_c$ is given by REF1. The UE determines a DL reference timing using a DL reference signal. For example, the UE can use SSB transmission(s) from the gNB in the Pt DL slot shown in FIG. 13 to determine the first detected path (in time) for purpose of establishing the DL reference timing of slots i or j. Alternatively, a timing reference signal may be configured for the UE with respect to which the DL reference timing of the serving cell is determined by the UE and/or the configurable receive timing adjustment value $N_{delta}$ is applied by the UE for a reception of a DL signal/channel. For example, an SSB or CSI-RS index is provided to the UE for purpose of determining the DL reference timing. The receive timing adjustment value $N_{delta}$ can be a positive or a negative value, e.g., the UE receive timing with respect to the DL reference timing can be delayed or advanced. When $N_{delta}=0$, the DL reference timing of the serving cell applies.

A value representative or associated with the receive timing adjustment value $N_{delta}$ provided to the UE can be signaled using either one or a combination of methods such as by DCI signaling, by RRC signaling, by MAC CE signaling, or the value can be tabulated and/or listed by system operating specifications. For example, the value can be signaled in the DL scheduling DCI using M bits and the UE determines a receive timing adjustment value $N_{delta}$ from one of up to $2^M$ values tabulated in system specifications using the DCI signaled index. In another example, a value can be configured by RRC parameter pdsch-TimeDomain-AllocationList, e.g., a value representative of or associated with a receive timing adjustment value $N_{delta}$ value is configured for a row in the TDRA table. The UE then uses the signaled index provided by the time-domain resource assignment field in the scheduling DCI to determine a receive timing adjustment value for the actual transmissions from the RRC configured table.

A receive timing adjustment value $N_{delta}$ applied by the gNB for DL transmissions to the UE in a slot can be used by the gNB to adjust the transmission timing of selected DL signals or channels. For example, and without loss of generality, PDCCH from the gNB in the first 1-3 symbols of slot i is transmitted using the DL reference timing, but PDSCH transmissions from the gNB to the UE in the subsequent symbols of slot i apply the UE receive timing adjustment.

When the UE is provided a receive timing adjustment value $N_{delta}$, the UE may assume that for subcarrier spacing configuration $\mu$, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot where $N_{symb}^{slot}$ depends on the cyclic prefix and is defined in REF1. The start of slot $n_s^\mu$ in a subframe is aligned in time with the start of OFDM symbol $n_s^\mu N_{symb}^{slot}$ in the same subframe for the DL reference timing determined by the UE. When the UE is provided a receive timing adjustment value $N_{delta}$, the UE may assume that OFDM symbol $n_s^\mu N_{symb}^{slot}$ of the DL transmission starts $N_{Delta}*T_c$ after the start of OFDM symbol $n_s^\mu N_{symb}^{slot}$ according to the DL reference timing of the reference cell.

When the UE is provided a receive timing adjustment value $N_{delta}$ applied to a DL signal or channel in a slot of the serving cell, the UE adjusts the DL reception timing for the PBCH, PDCCH, PDSCH or PSS, SSS, DMRS, CSI-RS, PTRS reception using the provided value $N_{delta}$ in the associated transmission resources. For example, for slots numbered from 0 to 4 in the UL-DL frame configuration shown in FIG. 13, if a receive timing adjustment value $N_{delta}$ is provided to the UE by a PDCCH using the DL reference timing for a PDSCH reception in slot 1, the UE adjusts the DL reception timing for the scheduled PDSCH symbols in slot 1 using the value $N_{Delta}$. The UE then applies the determined reception timing and demodulates and decodes the PDSCH on the scheduled transmission resources in the slot i. A later PDSCH transmission to the UE in slot 2 may not use a receive timing adjustment value. Accordingly, the UE does not adjust the DL reception timing for PDSCH in slot 2. The UE uses the DL reference timing in slot 2 to determine the start timing of OFDM symbols scheduled for the PDSCH reception in that slot for purpose of demodulation and decoding the PDSCH on the scheduled transmission resources.

For example, if a UE is configured with two DL carriers for a serving cell, a same receive timing adjustment value $N_{delta}$ may be applied to both carriers. For example, when the UE is configured with multiple DL BWPs for a serving cell and the UE is provided a receive timing adjustment value $N_{delta}$ for the active BWP of the serving cell, the UE adjusts the DL reception timing of a PBCH, PDCCH, PDSCH or PSS, SSS, DMRS, CSI-RS, PTRS reception in a slot of the serving cell based on the value $N_{delta}$ for the active DL BWP. A value for $N_{delta}$ may be provided to the UE for a suitable transmission duration. Although for conciseness in the descriptive parts of the disclosure a slot is often used as exemplary time unit, instead of a value $N_{delta}$ provided for a slot, a receive timing adjustment value may be associated with a symbol time interval or a multiple thereof. A receive timing adjustment value $N_{delta}$ may be associated or defined with respect to a same or an adjustable or scalable step size and/or desired timing resolution. For example, a value for $N_{delta}$ may be provided as a multiple of $16*64*T_c/2^\mu$.

Using the configurable receive timing adjustment value $N_{delta}$ in a slot to control the DL reception timing of DL transmissions to the victim UE with respect to UL transmissions from an interfering UE in a full-duplex slot, the relative receive timing difference as experienced by the victim UE in the full-duplex slot can be adjusted by the gNB. Even when a legacy UE supporting only a single TA and a single UL transmission timing procedure for all slots of a serving cell is scheduled for (interfering) UL transmission in the full-duplex slot, the reception timing of the DL transmission to the victim UE in the full-duplex slot can be controlled by the gNB. The receiving (victim) UE can adjust its receiver processing accordingly, because the receive timing adjustment value selected by the gNB is provided and known to the UE. The use of a configurable DL receive timing adjustment for DL receptions by the UE to minimize the relative timing difference during full-duplex operation in a slot is independent of the UL transmission timing procedure.

$N_{delta}$ value(s) including their associated slot(s), DL signal(s)/channel(s) and/or validity period(s) may be provided to a UE by one or a combination of L1 control signaling by DCI, RRC signaling and/or configuration, tabulated and/or listed by system operating specifications, or MAC CE signaling. If a same receive timing adjustment $N_{delta}$ value is provided for multiple UEs, a common DCI or common RRC signaling message may be used. A UE-specific DCI or RRC signaling of dedicated or common type may be used to provide value(s) of $N_{delta}$ to a UE. Only a first receive timing adjustment value $N_{delta,1}$ associated with a first DL transmission may be provided to the UE by DCI whereas a second receive timing adjustment value $N_{delta,2}$ associated with a second DL transmission may be determined by the UE by RRC configuration, MAC CE signaling or from system specifications. $N_{delta}$ value(s) provided to the UE by RRC signaling may be used in conjunction with MAC CE provided $N_{delta}$ values. A timing adjustment value $N_{delta}$ associated with the DL reception timing of a DL signal/channel on a serving cell may be determined by the UE by means of providing an index value through DCI signaling and the UE selecting one or more entries from an RRC configurable table using the provided index value. The UE may determine a default value for the receive timing adjustment $N_{delta}$ associated with a DL signal/channel or in a DL slot.

In one embodiment, a value associated with the receive timing adjustment value $N_{delta}$ to determine the DL reception timing of a DL signal/channel in a slot may be provided to the UE by L1 control signaling such as a DCI.

In one example, the value for the receive timing adjustment $N_{delta}$ is provided to the UE in a new information field "PDSCH timing offset" of size M bits in a DCI scheduling the PDSCH. The new information field is independent and separate from the time domain allocation field in the same DCI. A motivation is that the gNB scheduler can set and signal to the UE the value of the applicable sub-symbol PDSCH timing offset or receive timing adjustment independently from the more limited number of available symbol and slot allocations in the RRC configured TDRA table, e.g., 16 or 64. Another motivation is that the a suitable sub-symbol PDSCH timing offset or receive timing adjustment can be computed and applied by the gNB at run time, e.g., when scheduling the DL and UL transmissions in a slot for a selected set of UE DL-UL pairings.

TABLE 6 shows an example for the PDSCH timing offset field using M=2 bits where the index j refers to the symbol index j of the first OFDM symbol allocated by the RRC-configured PDSCH TDRA table in the slot. When the PDSCH timing offset field signals a value 00, no receive timing adjustment $N_{delta}$ is to be applied by the UE, e.g., the UE may assume that PDSCH transmission from the gNB uses the DL reference timing. Value 01 signals a receive timing adjustment $N_{delta}$ of ¼ symbol duration for the numerology μ configured in the DL BWP. The UE may assume that PDSCH DL transmission is offset, e.g., delayed by $N_{Delta}*T_c$=¼ symbol duration for numerology μ when compared to the DL reference timing. Value 10 results in ½ symbol offset for the PDSCH transmission, etc. In this example, the signaled sub-symbol PDSCH timing offset or receive timing adjustment is either 0 or a positive value, e.g., PDSCH transmissions are either delayed or use the DL reference timing.

TABLE 6

Example of new information field "PDSCH timing offset" for scheduling PDSCH

| Value | PDSCH starting offset |
| --- | --- |
| 00 | symbol j |
| 01 | (symbol j + 1 − symbol j)/4 |
| 10 | (symbol j + 1 − symbol j)/2 |
| 11 | 3*(symbol j + 1 − symbol j)/4 |

As can be seen by someone skilled in the art, a suitable range and resolution for the signaled PDSCH starting offset can be chosen without departing from the scope of the present disclosure. The range can comprise both positive and negative receive timing adjustment values for the purpose of delaying or advancing the PDSCH transmission timing which the UE may assume. The resolution or the range does not need to be uniform. For example, a PDSCH starting offset in the range of [−½ symbol duration, +¾ symbol duration] can be indicated, where M=3 bits in the PDSCH starting offset field allow to signal from a set of possible receive timing adjustment values [−½, −¼, 0, +⅛, +¼, +⅜, +½, +¾] of a symbol duration for numerology μ. A motivation is to allow for covering the needed range of receive timing adjustments when adjusting the receive timing difference of the victim UE with higher resolution in a value range with higher likelihood for observed time differences experienced during system operation. The range of the signaled PDSCH timing offset or receive timing adjustment can be larger than a symbol interval. For example, the PDSCH starting offset field can allow to signal from a set of possible receive timing adjustment values [−1, −½, 0, +¼, +½, +1, +3/2, +2] of a symbol duration for numerology µ. A motivation is the use of a signaled receive timing adjustment for the case of NR operation using higher numerologies such as in FR2, e.g., µ≥3 or SCS=120 kHz and above, where symbol durations are much shorter and the required receive timing adjustment values may be larger than a symbol duration at numerology µ. Furthermore, the PDSCH timing offset or receive timing adjustment in the example can be expressed in any suitable time unit, e.g., as a multiple of $T_c$ or $T_s$ defined in REF1 instead of fractions of an OFDM symbol duration at numerology µ provided by TABLE 6. Instead of a new information field in a DCI scheduling PDSCH, an existing field can be reused to provide an indication of a receive timing adjustment value to the UE. For example, the time-domain resource assignment field of length M bits in a DCI scheduling PDSCH can be partitioned into M1 bits providing an index into the RRC-configured TDRA table and M2 bits providing an indication for the receive timing adjustment value where M1+M2=M. In another example, an indication for the receive timing adjustment to determine reception timings for one or more DL signal(s)/channel(s) may be transmitted through a group DCI instead of a DL assignment DCI scheduling PDSCH reception.

Figure 14:
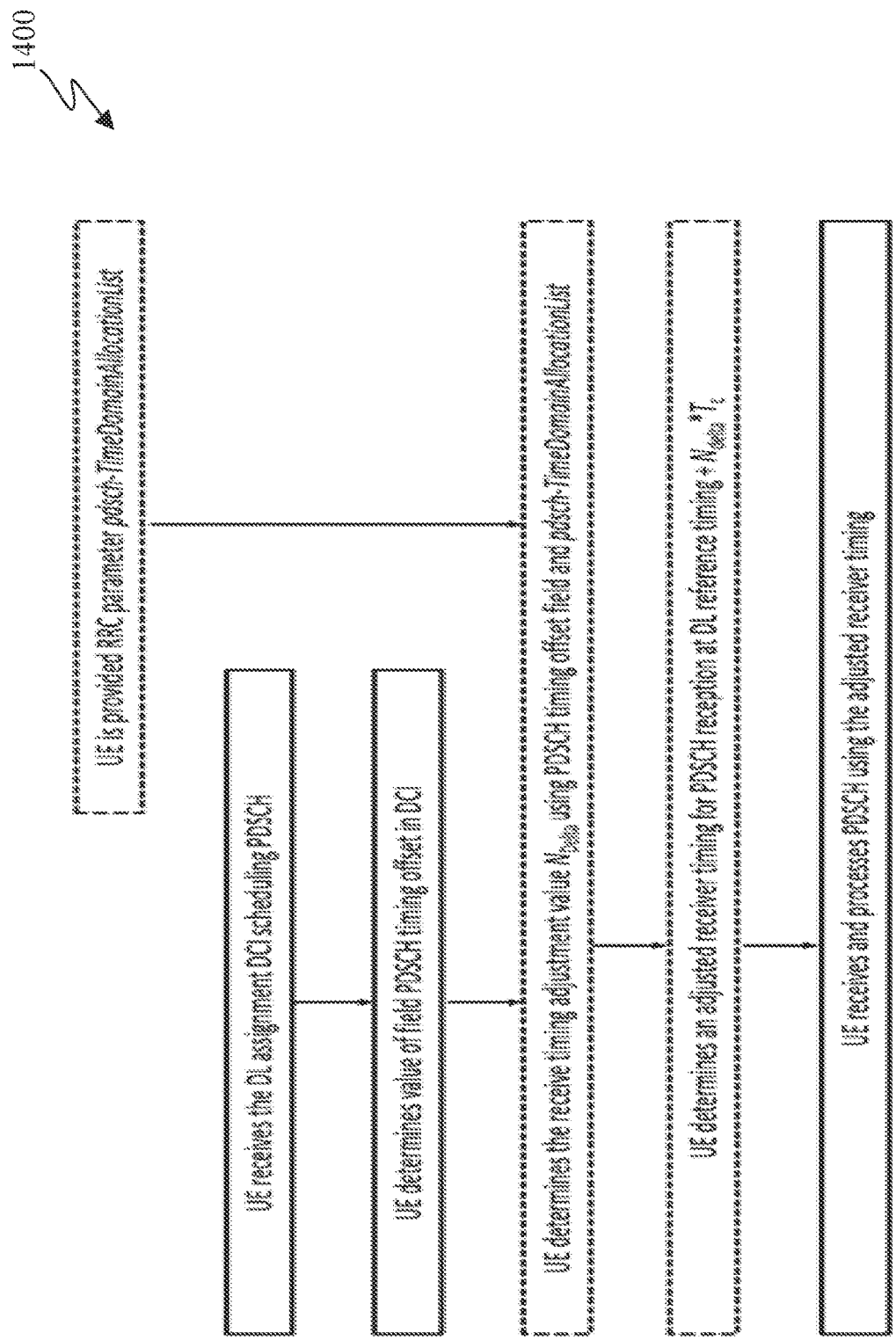
FIG. 14 illustrates an example PDSCH reception timing processing using a receive timing adjustment value provided by DCI according to the embodiments of the disclosure.

FIG. 14 illustrates an example PDSCH reception timing processing using a receive timing adjustment value provided by DCI 1400 according to the embodiments of the disclosure. The embodiment of the example PDSCH reception timing processing using a receive timing adjustment value provided by DCI 1400 illustrated in FIG. 14 is for illustration only. FIG. 14 does not limit the scope of this disclosure to any particular implementation of the example PDSCH reception timing processing using a receive timing adjustment value provided by DCI.

As illustrated in FIG. 14, a UE determines the reception timing for a DL transmission of PDSCH from the gNB in slot i. The UE has previously determined and maintains the DL reference timing of the serving cell. The UE has been provided by RRC with a PDSCH time-domain resource allocation table. The UE receives a DCI scheduling PDSCH in the slot. The UE determines the value of the field PDSCH starting offset in the DCI scheduling the PDSCH. The UE determines a reception timing of a first OFDM symbol carrying the PDSCH transmission using the receive timing adjustment value associated with the signaled value of the PDSCH starting offset field and obtains the symbol index of the PDSCH allocation in the slot indicated by the time-domain resource assignment field using the PDSCH time-domain resource allocation table. The UE determines an adjusted PDSCH reception timing as DL reference timing+ $N_{Delta}*T_c$. The UE adjusts its receiver processing to the reception timing determined in the previous step. The UE receives the PDSCH transmission in the symbols allocated to PDSCH transmission in the slot using the adjusted reception timing.

In one embodiment, a value associated with the receive timing adjustment value $N_{delta}$ to determine the DL reception timing of a DL signal/channel in a slot may be provided to the UE by higher layers, e.g., configured by RRC signaling.

A UE may be provided a higher layer parameter pdschTimingOffset by RRC signaling and configuration. The parameter may be included in one or more signaling messages and/or IEs. For example, and without loss of generality, the parameter pdschTimingOffset may be signaled from the gNB to the UE as part of RRC signaling messages of type RRCSetup, RRCReconfiguration, SIB1 or SystemInformation and may be included in RRC IEs of type ServingCellConfig, ServingCellConfigCommon, ServingCellConfigSIB1 or PDSCH-Config where an RRC configuration parameter may be of enumerated, listed or sequence type and/or may be encoded as a bit string.

In one example, the parameter pdschTimingOffset may be included into an information element of type PDSCH-TimeDomainResourceAllocationList as exemplified by the ASN.1 encoding example shown in TABLE 7. When the time-domain resource assignment field in the DCI scheduling the PDSCH providing the index into a row of the RRC configured TDRA table results in the UE determining a configured value of pdschTimingOffset=n0 for the PDSCH allocation in the slot, no receive timing adjustment $Na_{delta}$ is to be applied by the UE, e.g., the UE may assume that PDSCH transmission from the gNB uses the DL reference timing. Value n1024 (=16*64) signals a receive timing adjustment $N_{delta}$ corresponding to the timing advance step size for the numerology µ=0 configured in the DL BWP. The UE may then assume that PDSCH DL transmission in the slot is offset, e.g., delayed by $N_{Delta}*T_c$=0.521 µs (for numerology µ=0) when compared to the DL reference timing. Value n2048 results in 1.04 µs offset for the PDSCH transmission, etc. In this example, the signaled sub-symbol PDSCH timing offset or receive timing adjustment is either 0 or a positive value, e.g., PDSCH transmissions are either delayed or use the DL reference timing. A motivation is that the existing time-domain resource assignment field in DL assignment DCIs can be used to adjust the receive timing difference of a victim UE. Payload size of the DCI doesn't need to be increased and the DL link budget is preserved.

The example can be generalized to include the possibility of providing multiple configured parameters pdschTimingOffset for a PDSCH time-domain resource allocation, e.g., different absolute or relative offset settings per slot or per group of slots. A same or different absolute or relative offset values can be provided for a given slot of the PDSCH time-domain resource allocation when assigning different absolute or relative offset values to different row indexes where the slot occurs in the PDSCH-TimeDomainResourceAllocation table.

TABLE 7

Example PDSCH reception timing adjustment provided by RRC
PDSCH-TimeDomainResourceAllocationList information element -- ASN1START
-- TAG-PDSCH-TIMEDOMAINRESOURCEALLOCATIONLIST-START
PDSCH-TimeDomainResourceAllocationList ::= SEQUENCE (SIZE(1..maxNrofDL-Allocations)) OF
PDSCH TimeDomainResourceAllocation TABLE 7-continued Example PDSCH reception timing adjustment provided by RRC
PDSCH-TimeDomainResourceAllocationList information element

```
PDSCH-TimeDomainResourceAllocation ::= SEQUENCE {
    k0                            INTEGER(0..32)              OPTIONAL, -- Need
S
    mappingType                   ENUMERATED {typeA, typeB},
    startSymbolAndLength          INTEGER (0..127)
}
PDSCH-TimeDomainResourceAllocationList-r16 ::= SEQUENCE (SIZE(1..maxNrofDL-Allocations))
OF PDSCH-TimeDomainResourceAllocation-r16
PDSCH-TimeDomainResourceAllocation-r16 ::= SEQUENCE {
    k0-r16                        INTEGER(0..32)              OPTIONAL, -- Need
S
    mappingType-r16               ENUMERATED {typeA, typeB},
    startSymbolAndLength-r16      INTEGER (0..127),
    repetitionNumber-r16                     ENUMERATED {n2, n3, n4, n5, n6, n7, n8, n16}
OPTIONAL, -- Cond Formats1-0and1-1
    ...
}
PDSCH-TimeDomainResourceAllocationList-r17 ::= SEQUENCE (SIZE(1.. maxNrofDL-Allocations))
OF MultiPDSCH-TimeDomainResourceAllocation-r17
MultiPDSCH-TimeDomainResourceAllocation-r17 ::=           SEQUENCE {
    pdsch-AllocationList-r17                 SEQUENCE (SIZE(1..maxNrofMultiplePDSCHs-
r17)) OF PDSCH-TimeDomainResourceAllocation-r17,
    ...
}
PDSCH-TimeDomainResourceAllocation-r17 ::= SEQUENCE {
    k0-r17                        INTEGER (0..128)            OPTIONAL, -- Need
S
    mappingType-r17               ENUMERATED {typeA, typeB},
    startSymbolAndLength-r17      INTEGER (0..127),
    repetitionNumber-r17                     ENUMERATED {n2, n3, n4, n5, n6, n7, n8, n16}
OPTIONAL, -- Cond Formats1-0and1-1
    ...
}
PDSCH-TimeDomainResourceAllocation-r19 ::= SEQUENCE {
    k0-r19                        INTEGER (0..128)            OPTIONAL, -- Need
S
    mappingType-r19               ENUMERATED {typeA, typeB},
    pdschTimingOffset             ENUMERATED {n0, n1024, n2048, n3072, n4096, n5120,
n6144, n7168}
    startSymbolAndLength-r19      INTEGER (0..127),
    repetitionNumber-r19                     ENUMERATED {n2, n3, n4, n5, n6, n7, n8, n16}
OPTIONAL, -- Cond Formats1-0and1-1
    ...
-- TAG-PDSCH-TIMEDOMAINRESOURCEALLOCATIONLIST-STOP
-- ASN1STOP
```

A suitable range and resolution for the parameter pdsch-TimingOffset provided by higher layers and associated with the receive timing adjustment value $N_{delta}$ can be chosen without departing from the scope of the present disclosure. The range can comprise both positive and negative receive timing adjustment values for the purpose of delaying or advancing the PDSCH transmission timing which the UE may assume. The resolution or the range does not need to be uniform such as was described for the example case where the receive timing adjustment value $N_{Delta}$ is provided in a new information field "PDSCH timing offset" of size M bits in a DCI scheduling the PDSCH. The range of the parameter pdschTimingOffset provided by higher layers can be larger than a symbol interval. Furthermore, the parameter pdsch-TimingOffset or the receive timing adjustment provided by higher layers in the example can be expressed in any suitable time unit, e.g., as a multiple of $T_c$ or $T_s$ defined in REF1 or as fractions of an OFDM symbol duration at numerology µ.

Figure 15:
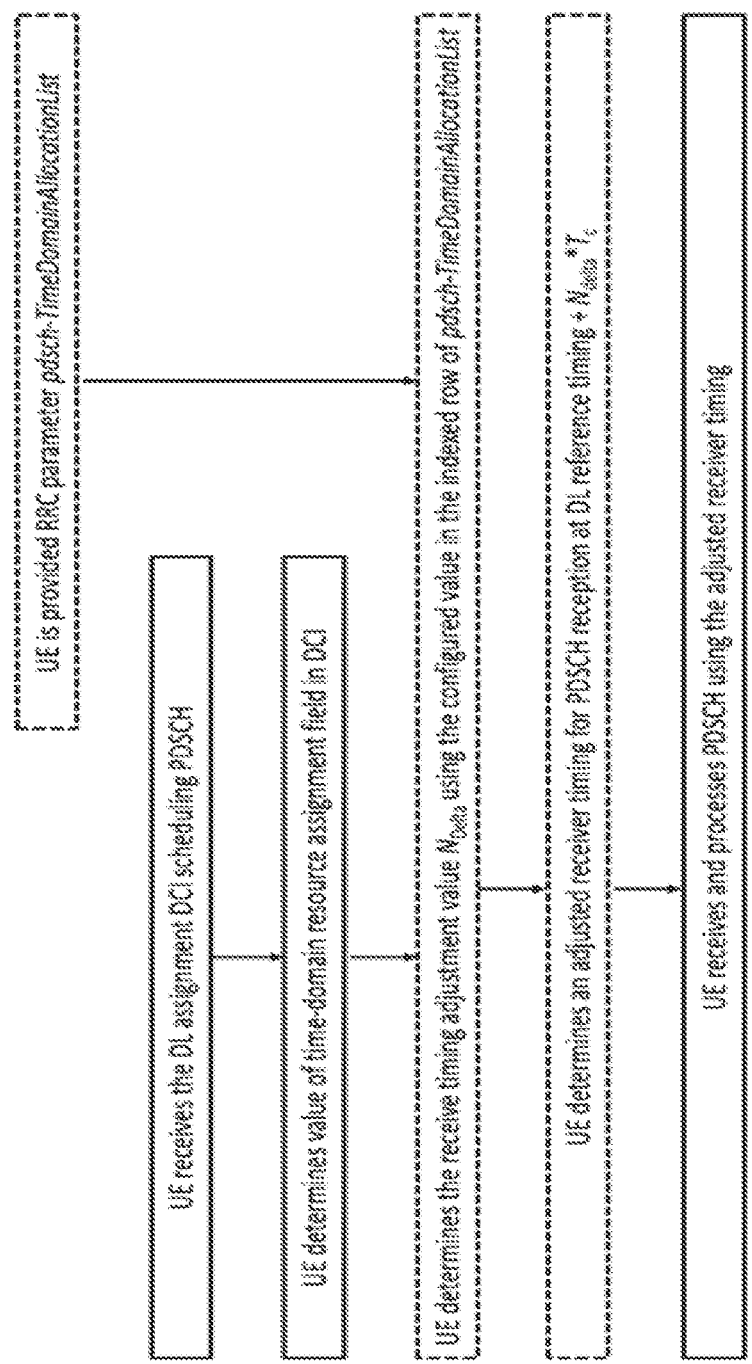
FIG. 15 illustrates an example PDSCH reception timing processing using a receive timing adjustment value provided by higher layers according to the embodiments of the disclosure.

FIG. 15 illustrates an example PDSCH reception timing processing using a receive timing adjustment value provided by higher layers 1500 according to the embodiments of the disclosure. The embodiment of the example PDSCH reception timing processing using a receive timing adjustment value provided by higher layers 1500 illustrated in FIG. 15 is for illustration only. FIG. 15 does not limit the scope of this disclosure to any particular implementation of the example PDSCH reception timing processing using a receive timing adjustment value provided by higher layers.

As illustrated in FIG. 15, a UE determines the reception timing for a DL transmission of PDSCH from the gNB in slot i. The UE has previously determined and maintains the DL reference timing of the serving cell. The UE has been provided by RRC with a PDSCH time domain resource allocation table. The UE receives a DCI scheduling PDSCH in the slot. The UE determines the value of the field time-domain resource assignment in the DCI scheduling the PDSCH. The UE determines a reception timing of a first OFDM symbol carrying the PDSCH transmission in the slot using the configured value of parameter pdschTimingOffset for an indexed row of the PDSCH time-domain resource allocation table indicated by the time domain resource assignment field. The UE determines an adjusted PDSCH reception timing as DL reference timing+$N_{Delta}*T_c$. The UE adjusts its receiver processing to the reception timing determined in the previous step. The UE receives the PDSCH transmission in the symbols allocated to PDSCH transmission in the slot using the adjusted reception timing.

Figure 16:
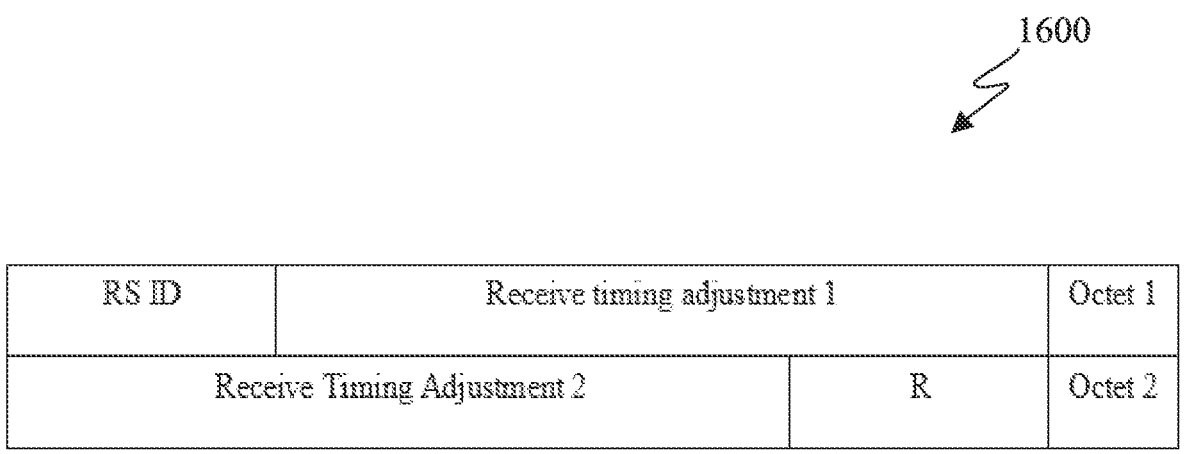
FIG. 16 illustrates an example of DL Rx Timing Command MAC CE according to the embodiments of the disclosure.

FIG. 16 illustrates an example of DL Rx Timing Command MAC CE 1600 according to the embodiments of the disclosure. The embodiment of the example DL Rx Timing Command MAC CE 1600 illustrated in FIG. 16 is for illustration only. FIG. 16 does not limit the scope of this disclosure to any particular implementation of the example DL Rx Timing Command MAC CEP.

In one embodiment, a value associated with the receive timing adjustment value $N_{delta}$ to determine the DL reception timing of a DL signal/channel in a slot may be provided to the UE by MAC CE. An indication to update the receive timing adjustment value $N_{Delta}$ for a DL signal/channel of a serving cell may be provided to the UE by a DL Rx Timing Command MAC CE. The MAC CE may select or (de-) activate a set of RRC configured or tabulated in system specifications receive timing adjustment values.

In one example shown in FIG. 16, a receive timing adjustment value $N_{Delta}$ for a DL signal/channel of a serving cell is provided to the UE through signaled index values for $T_{Delta}$ in the new DL Rx Timing Command MAC CE. The MAC CE may have length N=2 octets, or N for any required number of octets or bits. The gNB transmits and the UE receives the MAC CE associated with the receive timing adjustment value $N_{Delta}$ as part of an DL-SCH transmission. FIG. 16 shows the example of a length N=2 octets MAC CE format where the receive timing adjustment values $N_{Delta,1}$ and $N_{Delta,2}$ are provided to the UE using the MAC CE. The MAC CE may be identified by either a selected LCID or a selected eLCID value or a combination of LCID and eLCID values. The MAC CE has fixed size and consists of two octets. It contains a reference signal ID (RS ID) indicating the resource (or set) index of a configured timing reference signal. The length of the field is 2 bits. The MAC CE then contains two receive timing adjustment fields. The first receive timing adjustment field indicates the index value $T_{Delta,1}$ (0, 1, 2 . . . 63) used to control the adjustment of the reception timing which the UE may assume for reception of a first DL signal/channel, e.g., PDSCH. The length of the field is 6 bits. The second receive timing adjustment field indicates the index value $T_{Delta,2}$ (0, 1, 2 . . . 63) used to control the adjustment of the reception timing which the UE may assume for reception of a second DL signal/channel, e.g., PDCCH. The length of the field is 6 bits. The 2 reserved bits "R" are set to "0".

When the UE receives a DL Rx Timing Command MAC CE, i determines the adjusted reception timing as DL reference timing+$N_{delta,1}*T_c$ for the first DL signal/channel, e.g., PDSCH, in a slot from the signaled receive timing adjustment value $N_{Delta,1}$ using the signaled index value $T_{Delta,1}$ in the receive timing adjustment field 1 with $N_{Delta,1}=(T_{Delta,1}-31)*16*64/2^\mu$. Similarly, $N_{Delta,2}$ can be determined for the second DL signal/channel, e.g., PDCCH. A motivation for use of a MAC CE to adjust the reception timing which a UE may assume is the ability to adjust reception timing of DL signals or channels which do not use a scheduling DCI. For example, a MAC CE can be used to adjust the reception timing which the UE may assume for decoding of PDCCH or for the reception timing which the UE may assume when measuring CSI-RS resources.

As can be seen by someone skilled in the art, a suitable range and resolution for the receive timing adjustment value provided by MAC CE and associated with the receive timing adjustment value $N_{delta}$ can be chosen without departing from the scope of the present disclosure. The range can comprise both positive and negative receive timing adjustment values for the purpose of delaying or advancing the transmission timing of a DL signal/channel which the UE may assume. The resolution or the range does not need to be uniform such as was described for the example case where the receive timing adjustment value $N_{Delta}$ is provided in a new information field "PDSCH timing offset" of size M bits in a DCI scheduling the PDSCH. The range of the receive timing adjustment provided by MAC CE can be larger than a symbol interval. Furthermore, the receive timing adjustment provided by MAC CE in the example can be expressed in any suitable time unit, e.g., as a multiple of $T_c$ or $T_s$ defined in REF1 or other. A receive timing adjustment provided by MAC CE may be associated with a set of time-domain resources, e.g., a slot or set of slots or other suitable time-domain allocation unit for which the provided receive timing adjustment value applies (or not).

In another example shown in TABLE 8, a DL Rx Timing Command MAC CE signals which set of tabulated or configured timing adjustment values $N_{Delta}$ for a DL signal/channel of a serving cell the UE may use to determine the adjusted DL reception timing. When the UE is signaled through the MAC CE that Set 1 shall be used to determine the DL reception timing of a DL signal/channel in associated time-domain resources, the UE determines a value for the receive timing adjustment $N_{Delta}$ from the $2^{nd}$ column in TABLE 8. When the MAC CE signals that Set 2 is activated, the UE determines the DL reception timing from the $3^{rd}$ column. The index value in the first column may be provided by DCI signaling and/or by RRC configuration as described by other embodiments in the present disclosure.

TABLE 8

Example of DL Rx Timing Command MAC CE

| Value | PDSCH starting offset: Set 1 | PDSCH starting offset: Set 2 |
| --- | --- | --- |
| 00 | symbol j | symbol j |
| 01 | (symbol j + 1 − symbol j)/4 | (symbol j + 1 − symbol j)/8 |
| 10 | (symbol j + 1 − symbol j)/2 | (symbol j + 1 − symbol j)/4 |
| 11 | 3*(symbol j + 1 − symbol j)/4 | 3*(symbol j + 1 − symbol j)/8 |

As can be understood by someone skilled in the art, the naming or labeling of the new DL Rx Timing Command MAC CE format or the included IEs for purpose of receive timing indication is not important for as long as it is distinct from currently named IEs and parameterization provided by REF5. The new DL Rx Timing Command MAC CE may include additional fields not shown in the examples provided by FIG. 16. For example, a length indicator L or indicator of the number of RS IDs for which receive timing adjustment values are provided in the MAC CE may be included such that a variable instead of a fixed number of receive timing adjustment values can be signaled through the MAC CE. The field length(s) to signal receive timing adjustment values may be chosen differently as a function of the requires step size and maximum value(s).

When the UE is provided with a configurable receive timing adjustment value $N_{delta}$ allowing to adjust the DL reception timing in a slot with respect to the DL reference timing of the serving cell, a receive timing adjustment value $N_{delta}$ may be associated with a DL signal/channel of type PBCH, PDCCH, PDSCH and/or PSS, SSS, DMRS, CSI-RS, PTRS. A value of the receive timing adjustment $N_{delta}$ may be provided for a slot or a same $N_{delta}$ value may be configured for multiple slots. A value of the receive timing adjustment $N_{delta}$ may be associated with a transmission duration or validity period during which the receive timing adjustment $N_{delta}$ may be assumed the same by the UE. Different DL signal(s)/channel(s) may have a different associated transmission durations or validity periods, or a same transmission duration or validity period may be assumed by the UE. A same receive timing adjustment value $N_{delta}$ may be provided for multiple UEs to determine their DL receive timings in a slot, or different $N_{delta}$ values may be provided for different UEs. The determination of a second receive timing adjustment value $N_{delta,2}$ by the UE may depend on and be a function of a first provided receive timing adjustment value $N_{delta,1}$, e.g., the UE determines $N_{delta,2}$ as relative value compared to or as offset to $N_{delta,1}$.

A timing reference signal may be configured for the UE with respect to which the DL reference timing of the serving cell is determined by the UE and/or the configurable receive timing adjustment value $N_{delta}$ is applied by the UE for a reception of a DL signal/channel. One or more timing reference signals may be configured for the UE. A timing reference signal may be provided as TCI state(s) or RS resource index(es) corresponding to an SSB or to a CSI-RS resource index. A (DL) timing reference signal may be configured for the UE to determine its UL transmission timing.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for receiving a downlink (DL) signal or channel associated with a reception timing procedure, the method comprising:
   receiving:
      first information for a receive timing adjustment value, and
      second information for a condition;
   determining:
      a DL reference timing, and
      whether the condition is valid for reception in a slot; and
   receiving the DL signal or channel in the slot based on:
      the receive timing adjustment value and the DL reference timing when the condition is valid, and
      the DL reference timing when the condition is not valid.

2. The method of claim 1, wherein the first information is associated with an index value to determine the receive timing adjustment value.

3. The method of claim 1, wherein the first information is received using a downlink control information (DCI) information field or a media access control-channel element (MAC CE).

4. The method of claim 1, wherein:
   the condition is based on one of:
      a slot or symbol number,
      a slot or symbol type, or
      a DL signal or channel format; and
   the condition is valid when:
      the slot or symbol number is indicated for simultaneous transmission and reception during a same time-domain resource on a cell,
      the slot or symbol number is not indicated for simultaneous transmission and reception during a same time-domain resource on the cell,
      the slot or symbol type is one of a DL type, a flexible (F) type, or an uplink (UL) type,
      the slot or symbol type is one of subband full duplex (SBFD) or non-SBFD, or
      a format of the DL signal or channel is one of a physical downlink control channel (PDCCH), a physical downlink shared channel (PDSCH), a demodulation reference signal (DMRS), a channel state information-reference signal (CSI-RS), a phase tracking reference signal (PTRS) a physical broadcast channel (PBCH), a primary synchronization signal (PSS), or a secondary synchronization signal (SSS).

5. The method of claim 1, further comprising:
   identifying a validity period that is associated with the first information; and
   using the receive timing adjustment value when a reception timing is within the validity period.

6. The method of claim 1, further comprising:
   receiving a configuration for the DL reference timing,
   wherein determining the DL reference timing further comprises determining the DL reference timing based on the configuration.

7. The method of claim 1, wherein the first information is included in a time domain resource allocation (TDRA) table which is signaled via a radio resource control (RRC) information field.

8. A user equipment (UE) comprising:
   a transceiver configured to receive:
      first information for a receive timing adjustment value, and
      second information for a condition; and
   a processor operably coupled to the transceiver, the processor configured to determine:
      a downlink (DL) reference timing, and
      whether the condition is valid for reception in a slot;
   wherein the transceiver is further configured to receive a DL signal or channel in the slot based on:
      the receive timing adjustment value and the DL reference timing when the condition is valid, and
      the DL reference timing when the condition is not valid.

9. The UE of claim 8, wherein the first information is associated with an index value to determine the receive timing adjustment value.

10. The UE of claim 8, wherein the first information is received using a downlink control information (DCI) information field or a media access control-channel element (MAC CE).

11. The UE of claim 8, wherein:
the condition is based on one of:
- a slot or symbol number,
- a slot or symbol type, or
- a DL signal or channel format; and the condition is valid when:
- the slot or symbol number is indicated for simultaneous transmission and reception during a same time-domain resource on a cell,
- the slot or symbol number is not indicated for simultaneous transmission and reception during a same time-domain resource on the cell,
- the slot or symbol type is one of a DL type, a flexible (F) type, or an uplink (UL) type,
- the slot or symbol type is one of subband full duplex (SBFD) or non-SBFD, or
- a format of the DL signal or channel is one of a physical downlink control channel (PDCCH), a physical downlink shared channel (PDSCH), a demodulation reference signal (DMRS), a channel state information-reference signal (CSI-RS), a phase tracking reference signal (PTRS) a physical broadcast channel (PBCH), a primary synchronization signal (PSS), or a secondary synchronization signal (SSS).

12. The UE of claim 8, wherein the processor is further configured to:
- identify a validity period that is associated with the first information; and
- use the receive timing adjustment value when a reception timing is within the validity period.

13. The UE of claim 8, wherein:
- the transceiver is further configured to receive a configuration for the DL reference timing, and
- the processor is further configured to determine the DL reference timing based on the configuration.

14. The UE of claim 8, wherein the first information is included in a time domain resource allocation (TDRA) table which is signaled via a radio resource control (RRC) information field.

15. A base station (BS) comprising:
- a processor; and
- a transceiver operably coupled to the processor, the transceiver configured to transmit:
  - first information for a receive timing adjustment value,
  - second information for a condition, and
  - a downlink (DL) signal or channel in a slot for reception based on:
    - the receive timing adjustment value and a DL reference timing when the condition is valid, and
    - the DL reference timing when the condition is not valid.

16. The BS of claim 15, wherein the first information is associated with an index value to determine the receive timing adjustment value.

17. The BS of claim 15, wherein the first information is transmitted using a downlink control information (DCI) information field or a media access control-channel element (MAC CE).

18. The BS of claim 15, wherein:
the condition is based on one of:
- a slot or symbol number,
- a slot or symbol type, or
- a DL signal or channel format; and the condition is valid when:
- the slot or symbol number is indicated for simultaneous transmission and reception during a same time-domain resource on a cell,
- the slot or symbol number is not indicated for simultaneous transmission and reception during a same time-domain resource on the cell,
- the slot or symbol type is one of a DL type, a flexible (F) type, or an uplink (UL) type,
- the slot or symbol type is one of subband full duplex (SBFD) or non-SBFD, or
- a format of the DL signal or channel is one of a physical downlink control channel (PDCCH), a physical downlink shared channel (PDSCH), a demodulation reference signal (DMRS), a channel state information-reference signal (CSI-RS), a phase tracking reference signal (PTRS) a physical broadcast channel (PBCH), a primary synchronization signal (PSS), or a secondary synchronization signal (SSS).

19. The BS of claim 15, wherein a validity period, associated with the first information, indicates to use the receive timing adjustment value when a reception timing is within the validity period.

20. The BS of claim 15, wherein the transceiver is further configured to transmit a configuration that indicates the DL reference timing.

* * * * *